Sept. 21, 1926.  1,600,650
E. S. BIRD ET AL
LATHE
Filed August 31, 1923  11 Sheets-Sheet 1
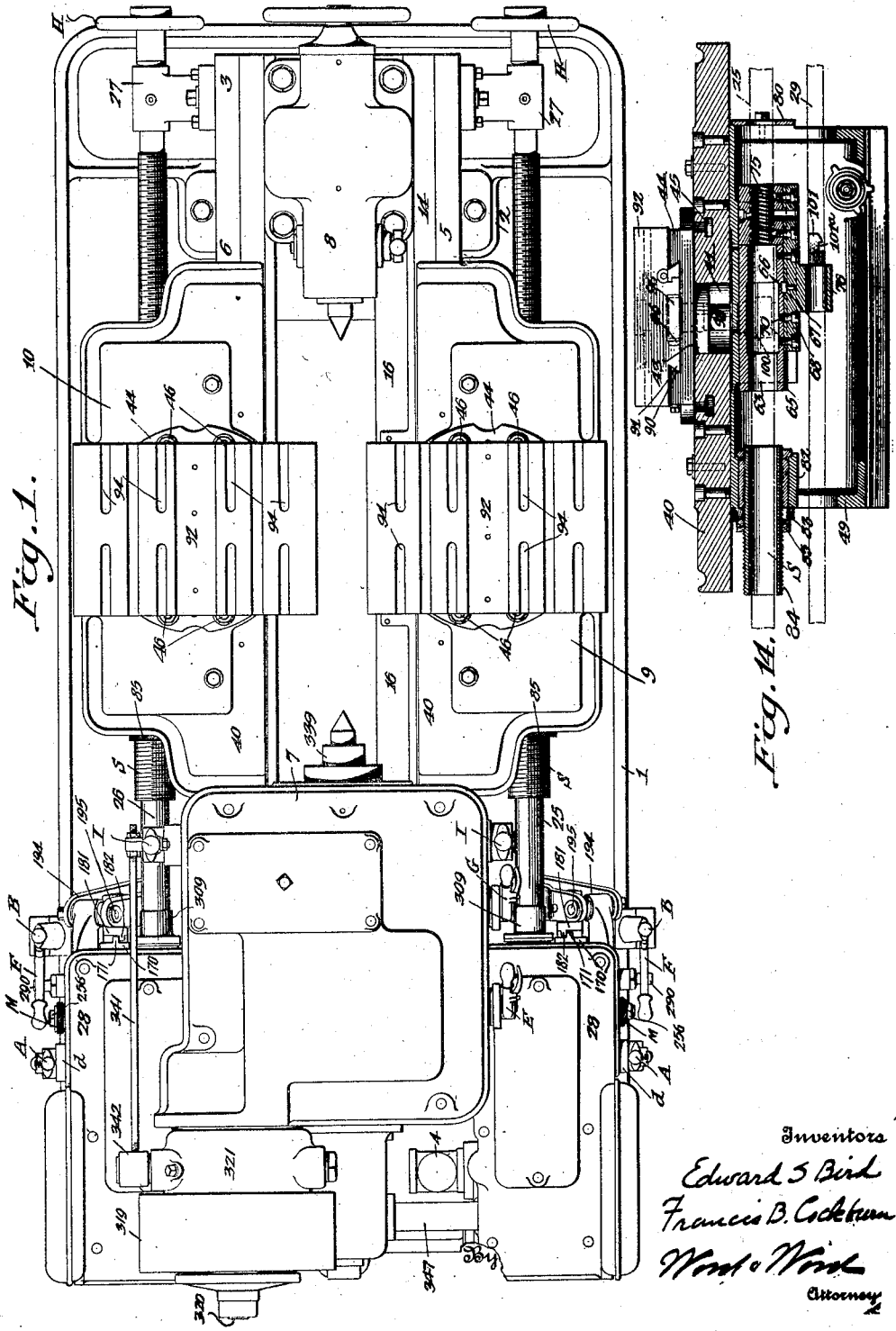

Sept. 21, 1926.　　　　　　　　　　　　　　　　1,600,650
E. S. BIRD ET AL
LATHE
Filed August 31, 1923　　11 Sheets-Sheet 2
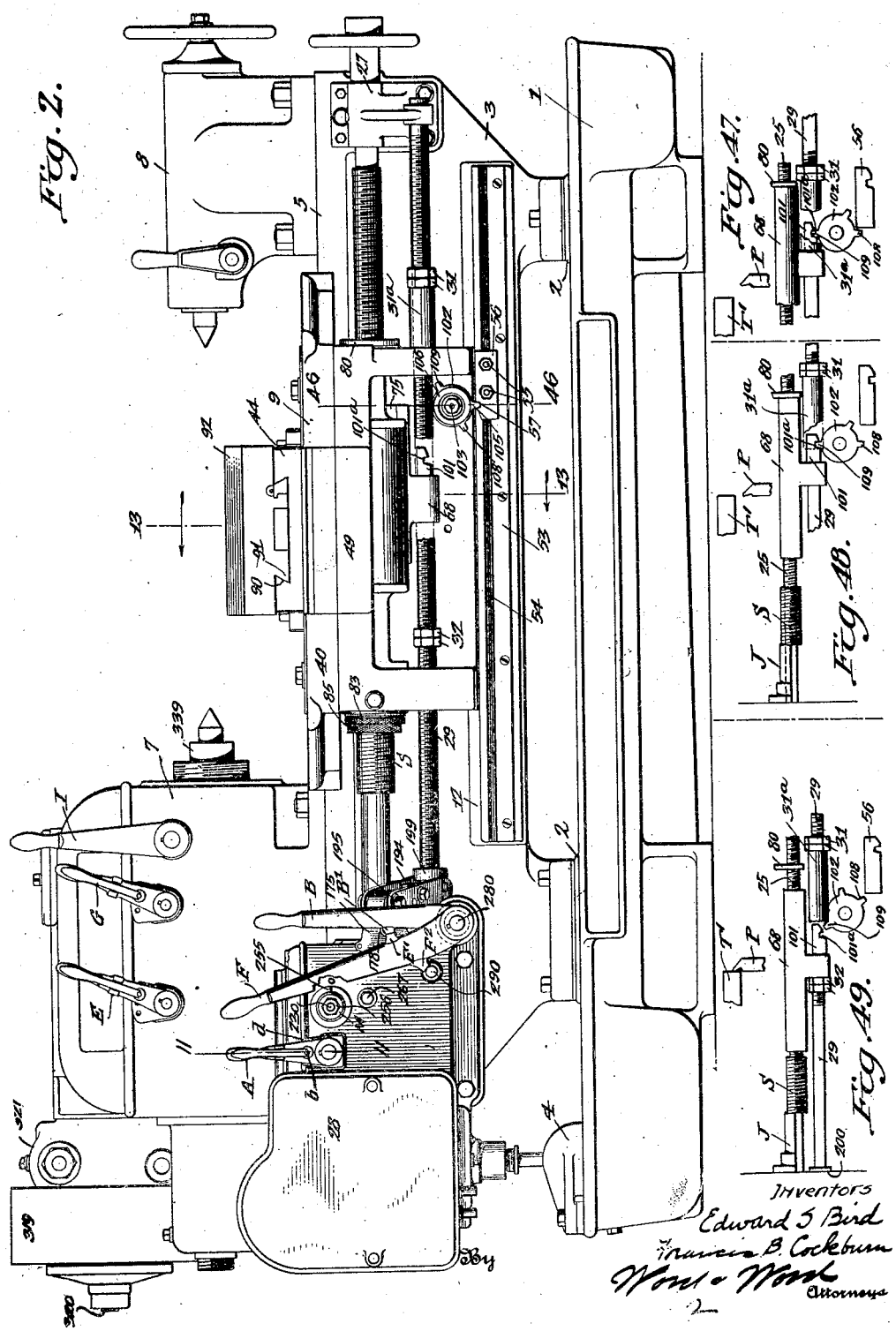

Sept. 21, 1926.  
E. S. BIRD ET AL  
LATHE  
Filed August 31, 1923   11 Sheets-Sheet 3
1,600,650
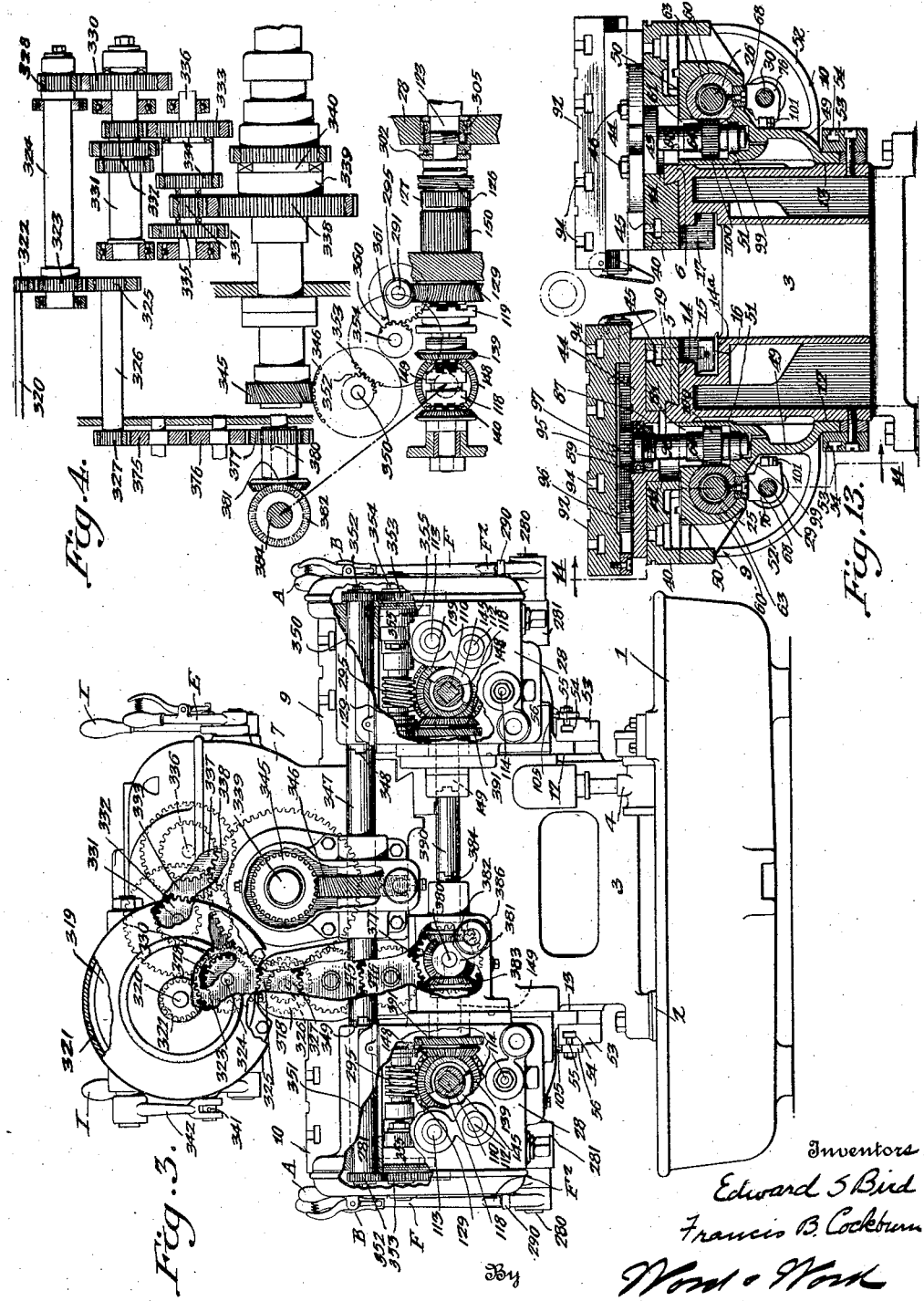

Sept. 21, 1926.  1,600,650
E. S. BIRD ET AL
LATHE
Filed August 31, 1923    11 Sheets-Sheet 4
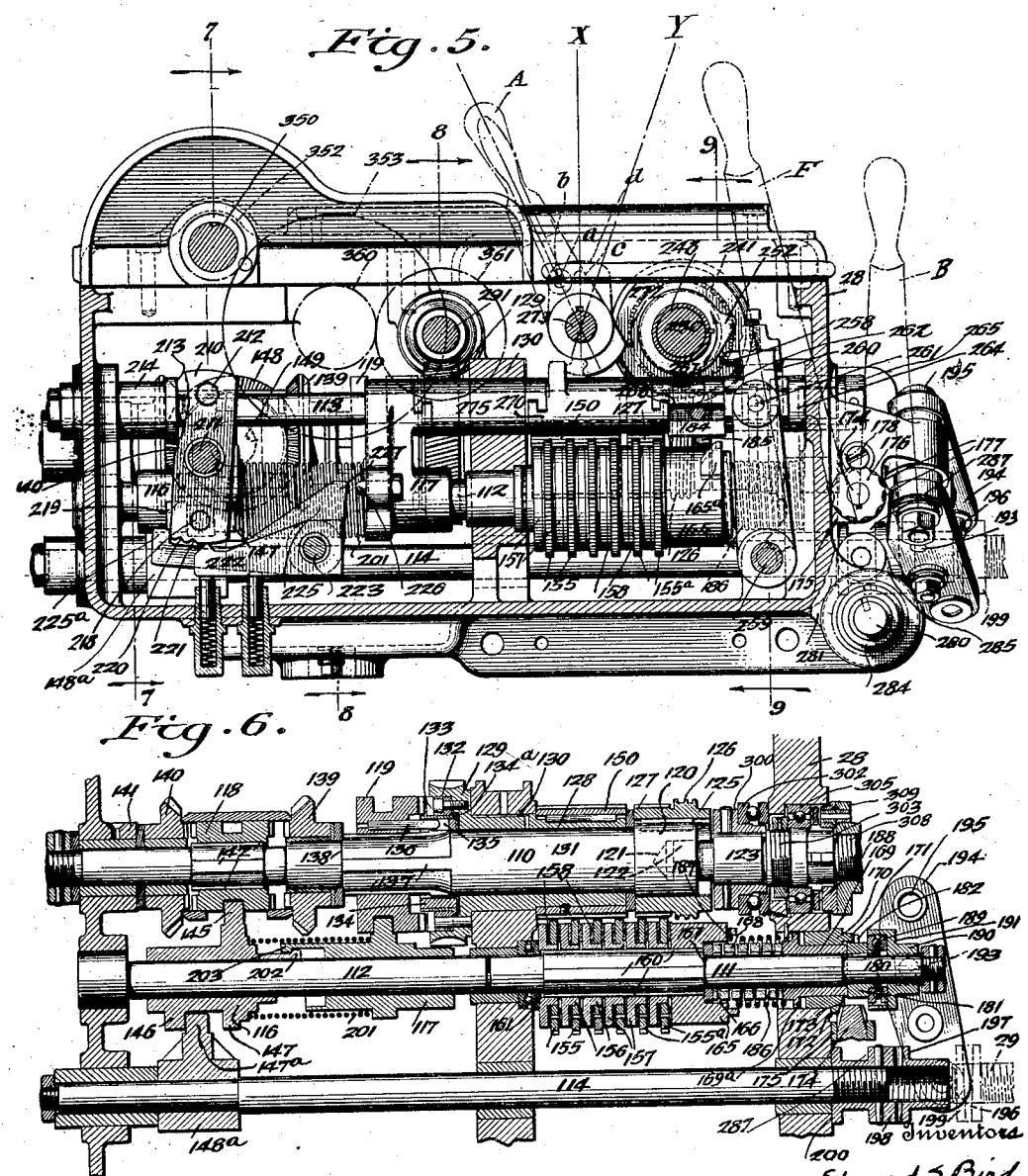

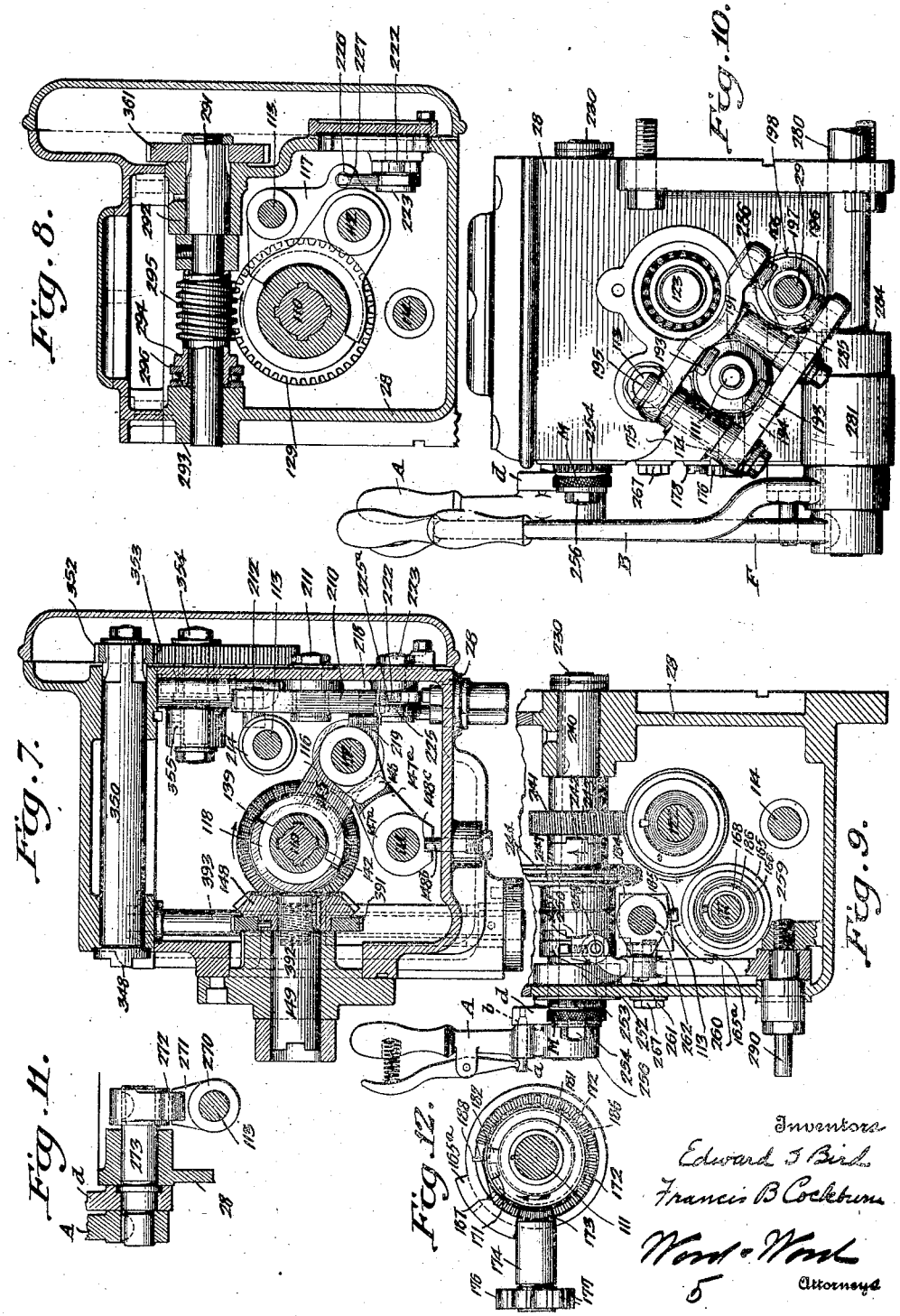

Sept. 21, 1926.
E. S. BIRD ET AL
1,600,650
LATHE
Filed August 31, 1923   11 Sheets-Sheet 6
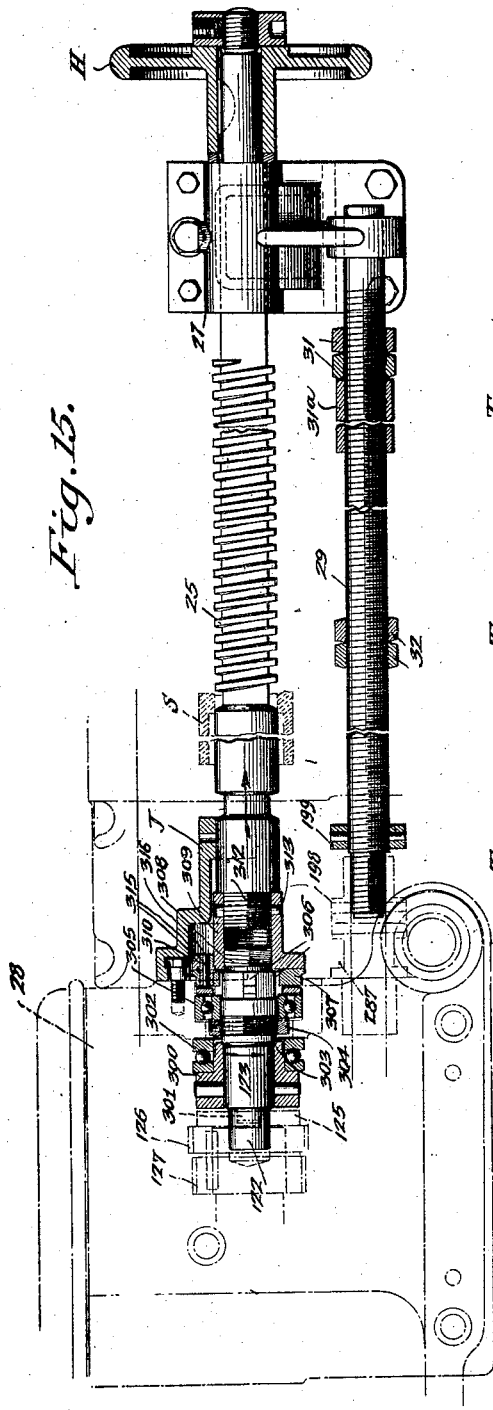
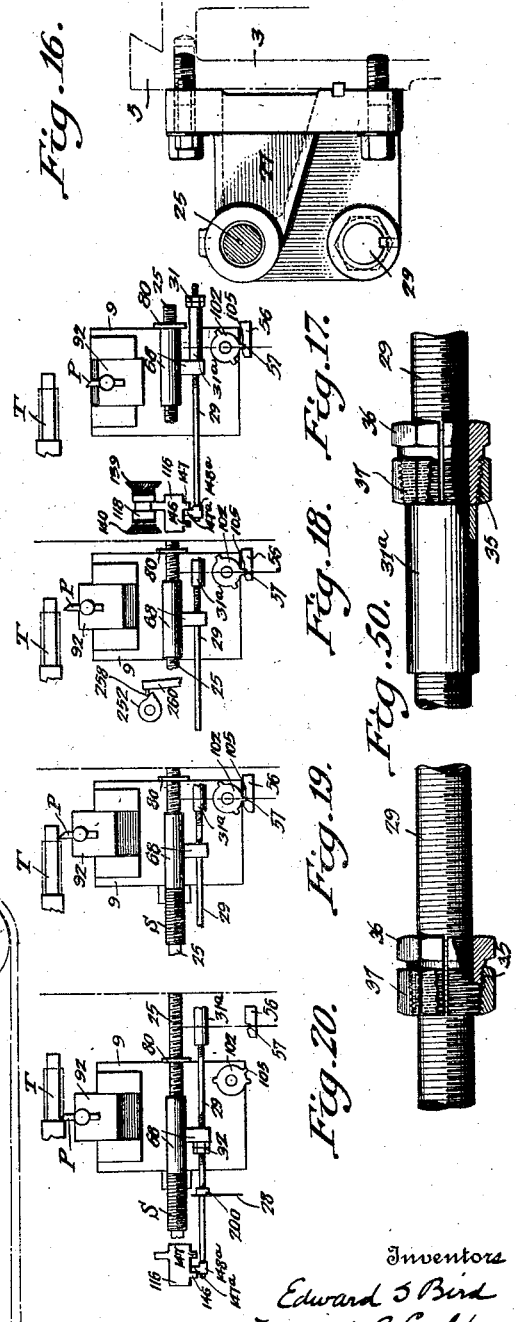
Inventors
Edward S Bird
Francis B Cockburn
By
Attorneys

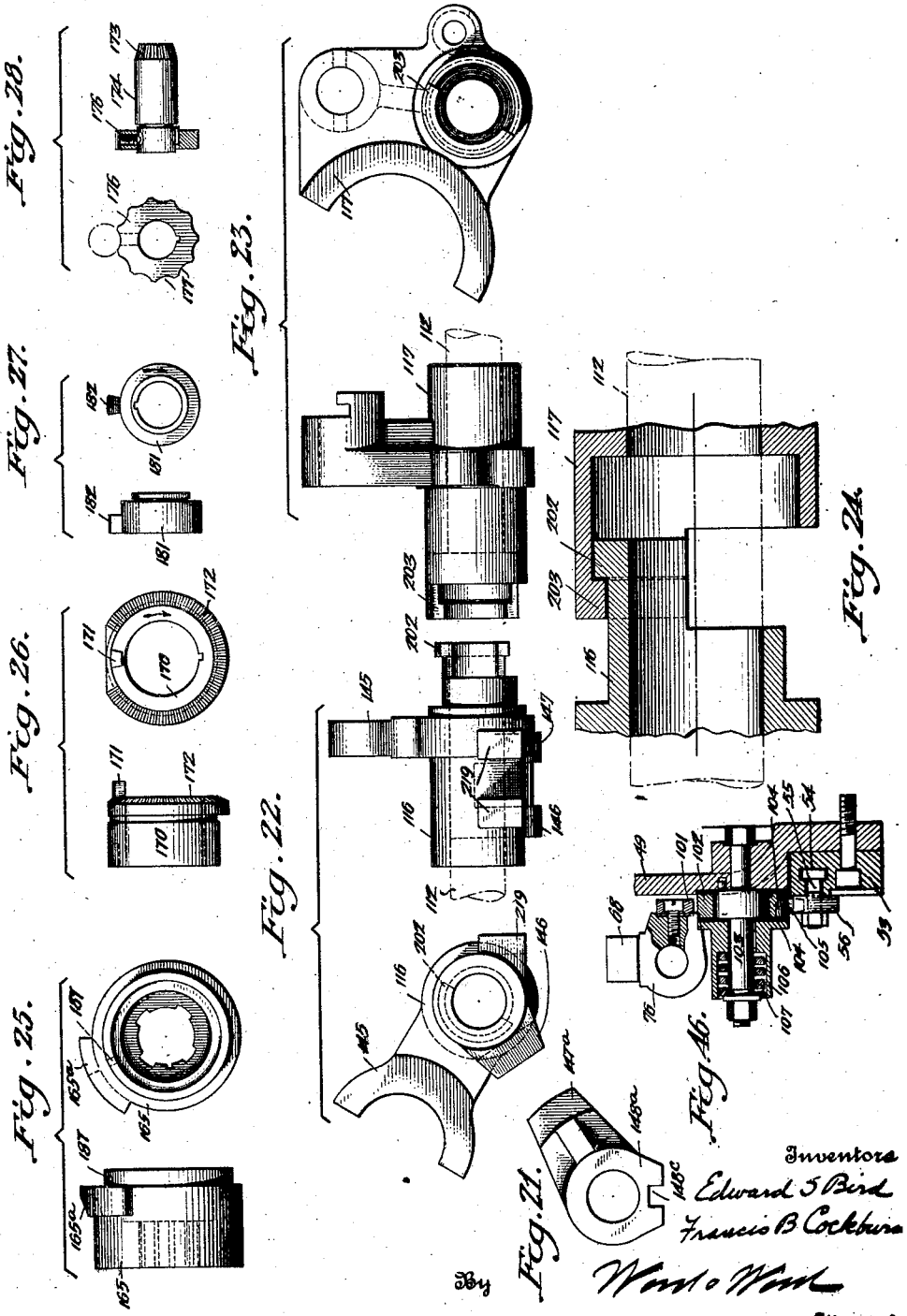

Sept. 21, 1926.  1,600,650
E. S. BIRD ET AL
LATHE
Filed August 31, 1923    11 Sheets-Sheet 8
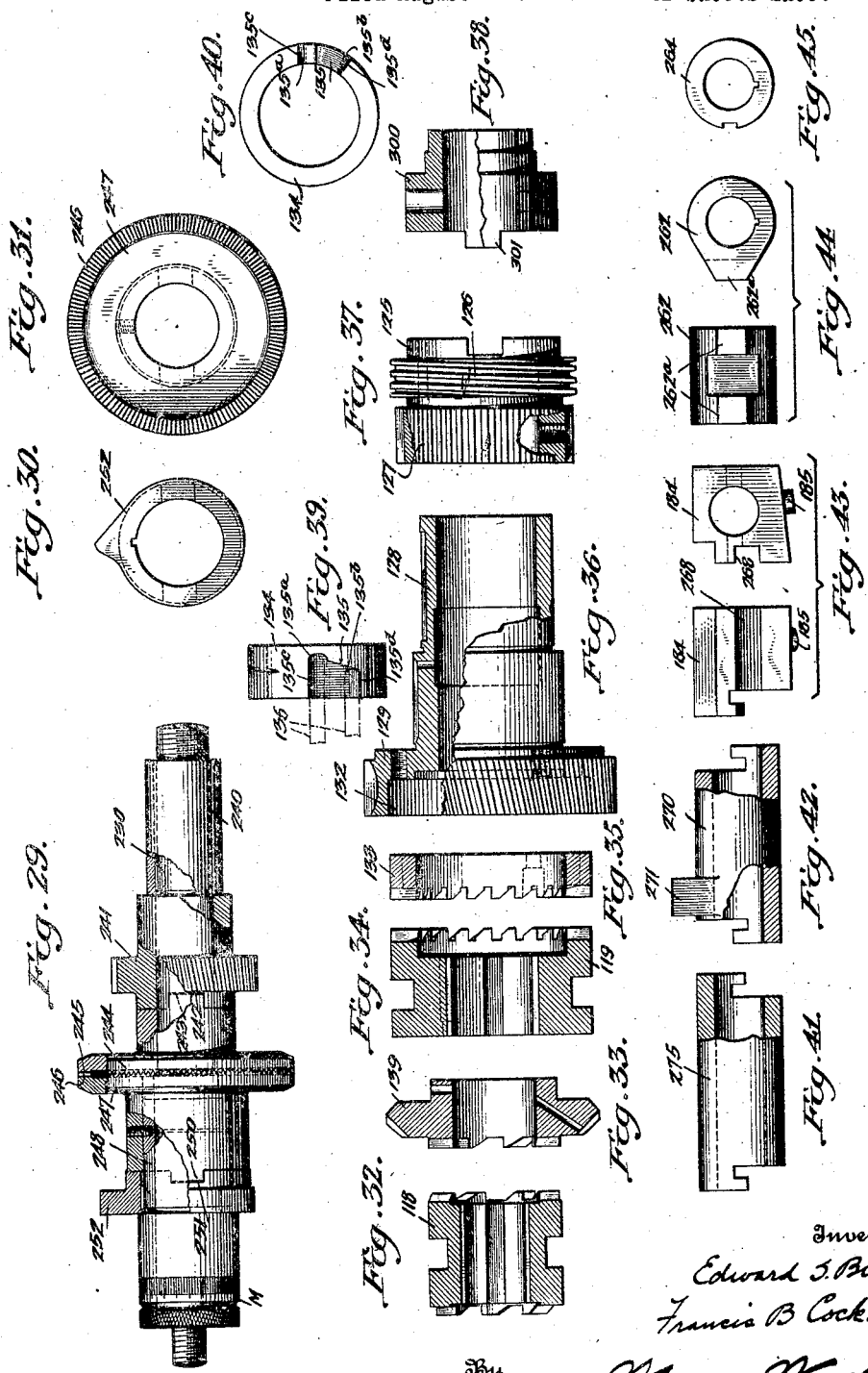

Sept. 21, 1926.  
E. S. BIRD ET AL  
LATHE  
Filed August 31, 1923  11 Sheets-Sheet 9

Inventors  
Edward S. Bird  
Francis B. Cockburn  
By  
Attorneys

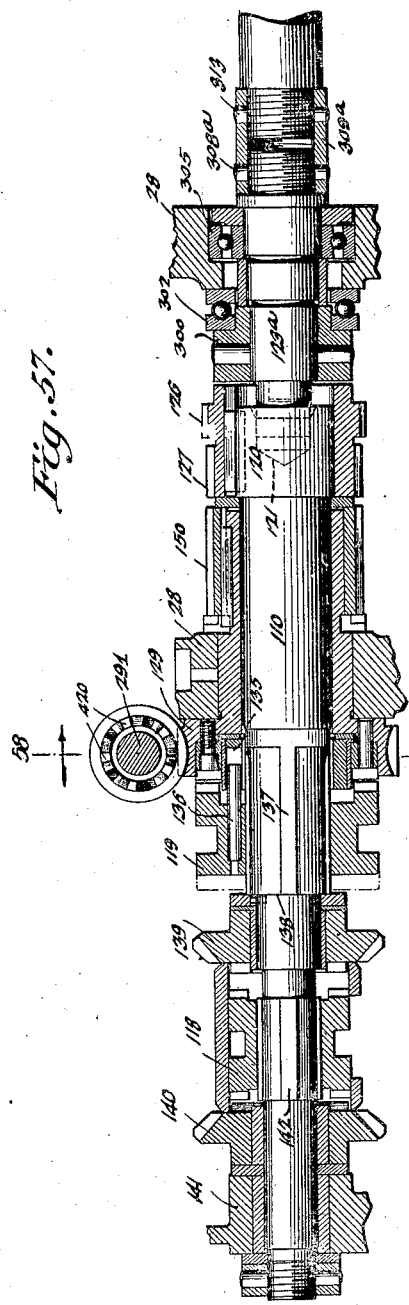

Sept. 21, 1926.  1,600,650
E. S. BIRD ET AL
LATHE
Filed August 31, 1923    11 Sheets-Sheet 11
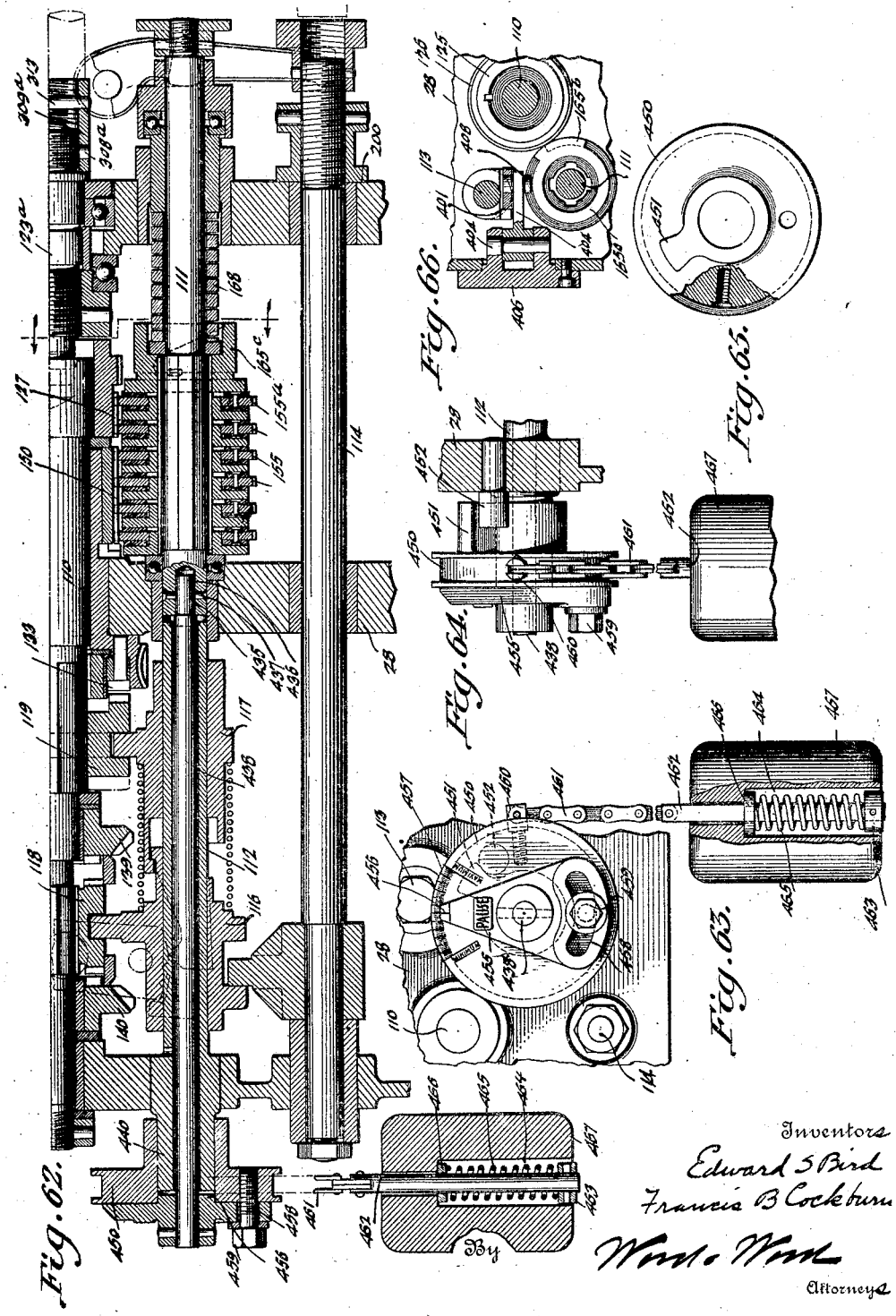

Patented Sept. 21, 1926.

1,600,650

UNITED STATES PATENT OFFICE.

EDWARD S. BIRD AND FRANCIS B. COCKBURN, OF CINCINNATI, OHIO, ASSIGNORS TO THE LODGE & SHIPLEY MACHINE TOOL COMPANY, OF CINCINNATI, OHIO, A CORPORATION OF OHIO.

LATHE.

Application filed August 31, 1923. Serial No. 660,317.

This invention relates to a metal cutting tool of the lathe type wherein the movements of the carriage and tool slide are automatically selectively controlled, wherein the work may be operated upon from relatively opposite sides, and wherein each tool or gang of tools may be operated independently and the operation timed so that either may precede the other.

Mechanism is provided for controlling feed screws, connected with improved carriage and tool slide units, said units forming the subject matter of a co-pending application filed February 26th, 1923, Serial No. 621,215. Only such reference to the construction and operation of the unit will be herein made as is necessary to a complete understanding of the automatic control thereof.

An object of the invention is the provision of an automatic machine having means for operating upon the work from relatively opposite sides, the means at each side being controlled by a separate feed screw operable either simultaneously or intermittently with its companion feed screw at the opposite side of the machine.

Another object of the invention is the provision of a machine automatically and selectively operable for machining different kinds of work without the use of special attachments for each kind, a change in machine setting being made by manipulating stops upon a shaft adapted for controlling, through special mechanism, the movements of the feed screws, the stops engageable by an element of the carriage and tool slide unit for translating or operating the shaft. The movements of the feed screws at opposite sides of the machine may be automatically selectively controlled for rapid and slow rotative speed.

Another object of the invention is the provision of means for automatically selectively and simultaneously, operating a plurality of tool carrier operating feed screws, each feed screw operating its tool carrier for various working cycles, during which the tool may be fed toward, into and longitudinally of the work to a definite degree, and the depth and length of cut being positively automatically controlled, the tool being subsequently withdrawn from the work and the carrier returned to the starting position.

The invention herein provides for the automatic timed rotation of both feed screws in rapid, forward and reverse traverse and forward feed directions, and further provides in conjunction with the carriage and tool slide units, means whereby for a working cycle the tool may be rapidly traversed toward the work, and slowly into or along the work. At a predetermined point of tool feed, mechanism comes into action, which cuts out the driving mechanism, with the tool feed continuing under auxiliary non-positive driving mechanism, until the feed of the tool is positively arrested. At this period the tool can be maintained stationary for a definite interval which may be governed by the number of work revolutions before return traverse of the tool commences, the return traverse bringing the tool to its starting position. For another cycle the carriage can be traversed to bring the tool to a setting position, the tool traversed rapidly towards the work then fed slowly into the same, and the tool thereafter rapidly withdrawn to fully retracted position and returned to the starting point.

The above operations in cycles may each be automatically performed after initial starting by a hand lever. Common power and traverse transmission trains connected with the mechanism of the feed boxes provide for the operation of the feed screws simultaneously or independently. Each screw may be stopped, started, reversed and made to rotate at varying speeds in forward and reverse directions independently of the other, making possible the timing of tool movement at relatively opposite sides of a piece of work in such manner that one tool may approach the work at one rate of speed, make a cut, and pause while the opposite tool performs a similar or different operation upon the piece, the operations being automatic from the time they are initiated until the end of the cycle.

Other objects and certain advantages will be more fully disclosed in the accompanying drawings forming a part of this specification, in which drawings:

Figure 1 is a top plan of an automatic lathe constructed in accordance with the principles of this invention.

Figure 2 is a side elevation.

Figure 3 is an end view at the head-stock end of the lathe, parts being broken away to show the gearing connections respectively between the pulley power shaft, spindle and control boxes, and between the pulley power shaft, rapid traverse gearing, and control boxes.

Figure 4 is a diagrammatic, or developed view illustrating the power and rapid traverse gear trains relative to spindle, and to the feed screw drive shaft, in the front control box.

Figure 5 is a vertical longitudinal section through the front control box.

Figure 6 is a diagrammatic or a developed view of the mechanism of the control box shown in Fig. 5.

Figure 7 is a transverse section on line 7—7, of Fig. 5.

Figure 8 is a transverse section on line 8—8, of Fig. 5.

Figure 9 is a transverse section on line 9—9, of Fig. 5, looking in the direction of the arrow.

Figure 10 is an end elevation of the front control box, taken from the control lever end, and showing the transmission or trip lever shaft in section.

Figure 11 is a detail section on line 11—11, of Fig. 2, showing the mounting of the feed cut-out lever.

Figure 12 is a view showing the relation of the pause index shaft to the pause catch, pause adjusting sleeve and pause trip cam.

Figure 13 is a cross section of the carriages and bed on line 13—13, of Fig. 2.

Figure 14 is a longitudinal section through the front carriage.

Figure 15 is a sectional side elevation illustrating the safety coupling connection between the feed worm shaft and feed screw shaft.

Figure 16 is an end elevation of the bracket supporting the outer ends of the feed screw and stop screw shafts.

Figures 17, 18, 19 and 20 are diagrams illustrating the setting of the machine for a turning cycle.

Figure 21 is a side elevation of the starter shifter fork.

Figure 22 shows end elevation and front elevation of the traverse clutch fork.

Figure 23 shows a front and side elevation of the feed clutch fork.

Figure 24 is a longitudinal section illustrating the manner of coupling the traverse clutch and feed clutch forks.

Figure 25 shows an elevation and end view of the pause trip cam.

Figure 26 shows an elevation and end view of the pause adjusting sleeve.

Figure 27 shows an elevation and end view of the pause catch.

Figure 28 shows an elevation of the pause index collar and a sectional elevation of pause index collar and pause index shaft.

Figure 29 shows the assembly of the traverse trip cam and related elements upon the traverse worm wheel shaft.

Figure 30 is a face view of the traverse trip cam.

Figure 31 is a face view from the tooth side of the traverse adjusting clutch member.

Figure 32 is a sectional view of the forward and reverse traverse clutch.

Figure 33 is a sectional view of the forward traverse miter gear.

Figure 34 is a sectional view of the feed clutch.

Figure 35 is a sectional view of the feed clutch ring.

Figure 36 is a sectional elevation of the sleeved feed worm gear.

Figure 37 is a sectional elevation of the worm and spur gear sleeve.

Figure 38 is a sectional elevation of the sleeve adapted to be pinned to the safety coupling shaft.

Figure 39 is a side view of the friction ring.

Figure 40 is a face view of the same.

Figure 41 is a sectional elevation of the traverse trip coupling.

Figure 42 is a sectional elevation of the feed trip block.

Figure 43 shows side and end views of the pause trip block.

Figure 44 shows side and end views of the traverse trip yoke.

Figure 45 is an end view of the traverse trip shaft bearing sleeve.

Figure 46 in a detail section of the carriage and tool slide friction device on line 46—46, of Fig. 2.

Figures 47, 48 and 49, are diagrammatic views showing the steps in setting the machine for a facing cycle.

Figure 50 is a sectional elevation of modified forms of stops, for the transmission controlling shaft.

Figure 51:
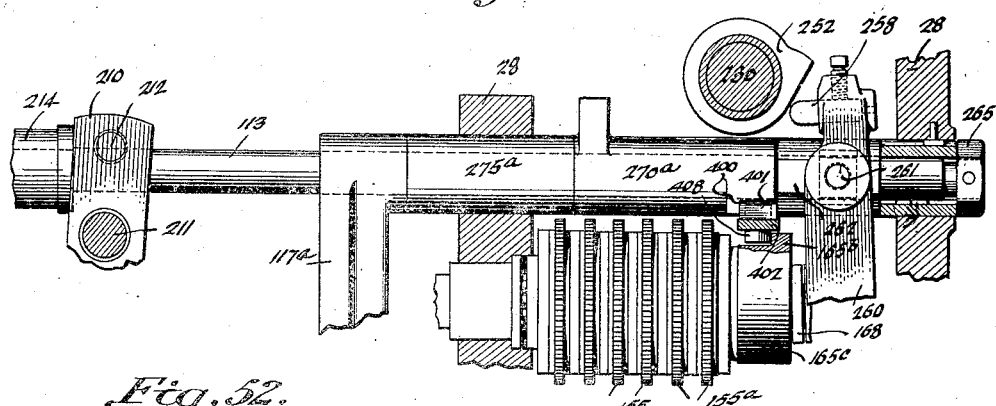

Figure 51 is a fragmentary elevation showing a modified form of pause cam member, and parts operable thereby.

Figure 52:
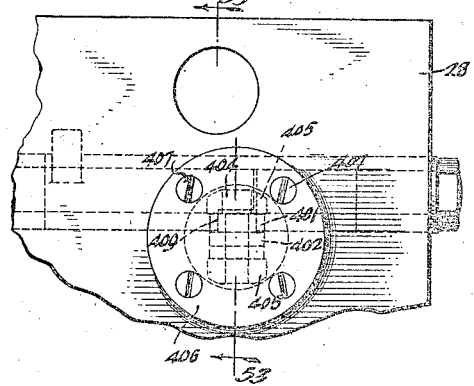

Figure 52 is a fragmentary face view of the front side of the box, showing the mounting of the pause cam lever.

Figure 53:
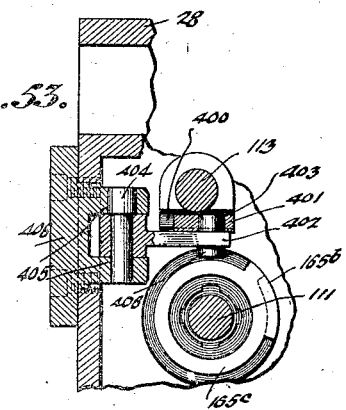

Figure 53 is a vertical sectional view on line 53—53 of Figure 52.

Figure 54:
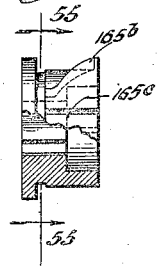

Figure 54 is a sectional elevation of the pause cam member.

Figure 55:
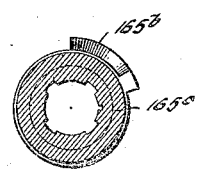

Figure 55 is a section on line 55—55 of Figure 54.

Figure 56:
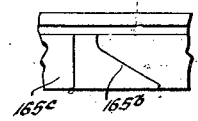

Figure 56 is a developed view of the cam projection.

Figure 57 is a longitudinal section illustrating a modified form of safety coupling connection or safety clutch device, as a part of the feed train, for preventing breakage of the tool.

Figure 58 is a transverse section on line 58—58 of Figure 57, showing the structure of the safety clutch, and arrangement thereof on the feed worm shaft.

Figure 59 is a fragmentary elevation showing the interlocked clutch teeth.

Figure 60 is a face view of the clutch member, showing the clutch teeth.

Figure 61 is a developed view of the teeth of the clutch member.

Figure 62 is a diagrammatic longitudinal section through the control box, showing a modified form of the pause cam setting, and return mechanism.

Figure 63 is an elevation of the mechanism looking at the rear end of the control box.

Figure 64 is a side elevation of the sheave, counterweight, and related parts.

Figure 65 is a face view of the sheave and stop lug thereon.

Figure 66 is a fragmentary cross section through the control box, showing the relations of the pause shaft and cam member, to the drive and traverse trip shafts.

Referring to the drawings, 1 indicates the base of the machine which has the form of a pan providing supports 2 to which are bolted the legs of the bed 3, the pan also providing an oil reservoir, having a pump 4 arranged therein, and attached thereto, for forcing the oil upwardly to the machine. The bed 3, the detailed structure of which is more fully described in the co-pending application, Serial No. 621,215, filed February 26, 1923, provides a pair of coplanar, parallel rails 5, 6. Upon the rails are mounted a head-stock 7 and tail-stock 8, the tail-stock being of any commercial type adapted for use on an engine lathe. Each of the rails of the bed is machined to provide for gibbed engagement of the tool carriages, said tool carriages herein being designated front and rear, respectively 9, 10. The rails each independently support and guide a tool carriage having a tool-slide and tool thereon; whereby the work may be simultaneously and selectively operated upon from relatively opposite sides, the carriage and tool-slide construction herein being a duplicate of that described in the above mentioned co-pending application.

The carriages and tool-slide units are of duplicate construction and each is gibbed to its respective rail. The description of carriage and slide construction will therefor herein be confined to that of one carriage.

The front carriage 9 on the rail 5 has its cutting tools arranged to engage the work at the horizontal center thereof, pressure or strain upon the carriage being in a downward direction while the pressure or strain on the rear carriage 10 is in an upward direction. The front carriage therefor has a rail engagement for supporting it against downward pressures, and the rear carriage a rail engagement for supporting it against upward pressures. At opposite sides of the bed near the base are provided bearing surfaces, respectively 12, 13, with which are slidably engaged the lower ends of the respective carriages. The front rail 5 is provided with two horizontal wide-faced bearing surfaces 14, 14$^a$, engaged by a gib-block 15 secured to the under side of the front carriage, and at each side of the gib-block are attached cover plates 16 which rest upon the bearing surface 14$^a$, as a protection for the same. The gib-block 15 rigidly supports the rear end of the carriage against downward strains submitted thereto. The upward thrust of rear carriage strains are carried by the gib-block 17.

Inasmuch as the present invention is particularly directed to the automatic control of the carriage and slide, only so much description as is necessary for a clear understanding of the carriage and slide construction and action will be given herein.

Each carriage has its feed screw shafts 25, 26 respectively front and rear. The screws are disposed longitudinally at the opposite side of the machine bed and each screw at the tail-stock end is journaled in a bearing 27, while at the head-stock end each is coupled to a screw drive shaft contained in the control box 28, the manner of coupling being hereinafter more fully described.

Two transmission controlling shafts 29, 30, herein called stop screw shafts, are employed, one for each carriage, and the same extend parallel with respective screw shafts and beneath the same. Each shaft is longitudinally slidably journaled at one end in the bearing 27, and at the opposite end are coupled to shafts which are mounted within the control box. The stop screw shafts are both threaded for their length between their bearing points, and each shaft carries two pairs of nuts 31, 32, one a jamb nut, engageable with respective opposite sides of the traveler block for operating the control box mechanism, to stop and reverse slide and carriage action. The distance between the nuts governs the period of carriage and tool-slide traverse upon the rail in either forward or return directions, the nuts as trip dogs being engaged with the traveler block. One nut 32 is engaged when the carriage moves in a forward direction toward the head-stock, and one of the nuts, 31, is engaged during return carriage traverse toward the tail-stock.

Modified form of stop devices are shown in Figure 50, in which adjustment may be quickly made; compare with corresponding devices of Fig. 15. In this form the stop sleeve 31$^a$ is retained, but the jamb nuts are of modified structure. One nut, 36, is made in two half sections interiorly threaded for engagement with the threads of the shaft 29, and exteriorly taper-threaded as at 35, The sections of the nut may therefore be quickly disengaged from the threads of the shaft and moved to the desired position. After adjusting the sectional nut, 36, the sleeve nut 37, is engaged with the taper threads and tightened, to lock said nut 36. The nuts are identical in structure, the extension sleeve 31ª being engaged with or against one of the nuts as shown.

*Carriage and tool slide construction.*

The construction of both carriages is identical, (see Figs. 13 and 14). Each carriage consists of a plate 40 having its under side longitudinally machined for gibbed engagement with the top of the rail. The carriage plate 40 centrally is provided with a circular opening 41 vertically therethrough for the reception of the corresponding circular boss 43 of the swivel block 44, which swivel block rests upon the upper face of the carriage plate and is capable of rotative movement and adjustment thereupon about the boss as a pivot. A circular T-slot 45, concentric with the opening 41, is provided, into which are engaged the heads of bolts 46, whose shank 47, extend upwardly through openings of the swivel block and have nuts engaged therewith, whereby the block may be clamped in any desired angular position relative to the carriage. The carriage plate is gibbed to the rail as at 15, and the gib is held by screws 19 passing through the carriage plate, as shown. The apron 49 is fastened by bolts to and beneath the carriage plate 40 and comprises a box-like casting having horizontal and vertical substantially plane faces respectively 50, 51, at a right angle to each other. The outer side of the apron at its opposite ends is provided with bracket walls each having a flanged front face 52. A bearing surface is provided at the bottom of the vertical face 51 which is designed for sliding coaction with the respective surfaces 12, 13 to assist in stabilizing the carriage. A guide strip 53, extending lengthwise of the bed, is attached thereto by screws and overlaps the lower end of the apron, which is slidably held between the strip and the bed surface. The strip is provided with a longitudinal T-groove 54 at its outer side for the reception of headed bolts 55, the shanks of which traverse a trip plate 56, having a notch 57 in its upper edge. The plate may be adjusted lengthwise of the slot and clamped to adjusted position. The strip is bolted against spacer blocks, and the slide-way formed between the strip and the bed surface, together with the gib and clamp, provide substantial sliding connection between the bed carriage and apron. The apron has formed therein horizontal and vertical intersecting bores respectively 60, 61 at a right angle to each other, and horizontally slidably engaged within the bore 60 is a substantially cylindrical sleeve 63, having teeth 64 at one side, which teeth project within the bore to a distance approximately equal to tooth depth. The sleeve rack, hereinafter called the sleeve, is grooved longitudinally at the bottom as at 65 and crosswise as at 66 to provide respectively a seat into which is fitted the upper end of the trip-block, and a key registerable with the corresponding groove 67 of the trip or traveler block 68. The key is engaged with both grooves 66, 67, as a means of locking the block and sleeve together. The trip block is further attached to the sleeve by screws 70. At one end of the sleeve rack 63 and abutting the same is disposed, and by screws attached to the trip block, a feed screw nut 75 having internal threads adapted to be engaged by the corresponding threads of the feed screw, which screw passes loosely through the bore of the sleeve 63. The trip block has a depending projection 76 loosely traversed by the trip shaft and the projection has a rearward extension, having a groove therein. Attached within the groove is a catch plate 101, hereinafter called the friction finger, having a notch 101ª in the lower edge. The function of this finger will be hereinafter described. The sleeve and nut may be regarded as a unit non-rotatively but translatively secured within the apron and adapted to be fed or traversed longitudinally upon the feed screw in forward or return direction, depending on the direction of revolution of the screw drive shaft. The traveler block translates the carriage when engaged therewith, and provision is made for the translation of the block within the carriage and within regulatable limits for imparting motion to the tool slide mounted upon the carriage. Thus the block is utilized for both carriage traverse upon the rail and tool slide feed upon the carriage. The screw shaft and transmission control rod or stop screw shaft extend through openings in the opposite end bracket walls of the carriage apron, one wall thereof being provided with a stop plate 80, loosely traversed by the feed screw, said plate being secured to the wall by screws. The nut end of the sleeve in one direction of traverse engages against the stop plate 80 for translatably connecting the sleeve and carriage to move the carriage. With the end of the sleeve engaged with the plate, the sleeve is free to travel towards the opposite apron wall without imparting translative movement to the carriage, during which movement the sleeve imparts motion to the tool-slide. The distance of translative movement of the nut and sleeve upon the screw shaft when traveling in a direction away from the stop plate is limited by a sleeve stop screw S loosely traversed by the feed screw. The threads of the stop screw are engaged with the corresponding threads of the stop screw nut 82, held against rotation in a hub or boss cast in the end wall of the apron. The boss at the outer side extends slightly beyond the surface of the wall to provide an annular surface having thereon a graduation mark with which are registerable the graduations of the stop screw adjusting collar 83 splined to the longitudinal groove 84 of the stop screw, whereby when the collar is rotated in either direction the stop screw will be rotated and translated in corresponding direction for a predetermined distance. The jam nut 85 holds the graduated stop screw collar in adjusted position. When the left end of the sleeve 63 engages the inside end of the stop screw S, the carriage will be translated upon its bed toward the head-stock until traverse of the feed nut is stopped either by discontinuance of screw shaft rotation or by reversing the rotation. The distance of travel of the sleeve 63 between the plate 80 and the inner end of the stop screw S, therefor defines the degree of sleeve traverse for transmitting motion to the tool-slide.

The swivel block 44 is bored concentrically with the boss as at 87 and counterbored to provide a circumferential shoulder, as a seat for a ball bearing 89. The top of the swivel block has a dove-tailed cross groove 90 as a slide-way with which coacts the corresponding slide projection 91 of the tool-holding slide 92, a gib being interposed for frictionally and slidably attaching the tool-slide 92 upon the swivel block. The cross or tool-holding slide has the usual tool attaching T-groove or slots 94 in its upper face and has in addition a longitudinal depression or cavity 95 in its lower side, within which is fitted and fastened by screws a gear rack 96. The gear rack 96 is transmittingly connected with the feed nut rack in the following manner:

A spur gear 97, meshing with the gear rack 96, is fixed at the upper end of a journal or shaft 98 rotatively stepped in respective upper and lower ball bearings 89, 99. Keyed upon the lower end of the shaft 98 is a sleeve spur gear 100 which meshes with the teeth 64 of the sleeve 63. Thus when the sleeve is moved in the appropriate direction the cross-slide will be correspondingly fed upon the carriage toward or away from the work.

The traveler block and sleeve are non-rotatively sustained within the carriage, and the sleeve is adapted to engage with the carriage to propel the same. The spaced relation between the carriage and sleeve or propelling member, is such that the abutting engagement of the member with the carriage at either of regulatable spaced opposing points determine the period and degree of tool slide transmission independently of the carriage. This permits the cutting tool to be readily selectively operated for various working cycles. Thus for one cycle a tool with the carriage can be fed toward and into the work, and alternately in retracted direction, for depth cutting or end facing of the work. For another cycle the tool can be fed from a retracted or starting position toward and into the work to a definite degree during which period the propelling member transmits the tool slide only. After the tool has been fed to the desired cutting depth, cooperation between the propelling member and carriage takes place for feeding the tool longitudinally of the work, and under such conditions the propelling member is incapable of transmitting motion to the slide, which slide is thus held locked against cutting strains. After the carriage has been traversed for the required distance to the end of the cut, the direction of traverse of the screw is automatically reversed, following which the cutting tool is moved to retracted position, and the carriage returned toward the tail-stock end of the machine, to initial position.

Further description of the structure and operation of the carriage and tool slide is thought unnecessary, inasmuch as reference may be had to the co-pending application before mentioned.

*Carriage and tool slide friction device.*

It is desirable under certain conditions to prevent carriage movement during a fraction of a turning cycle, to-wit, during that fraction in which the tool is being traversed to cutting position. In a facing operation it is desirable to prevent tool slide motion while the carriage moves to that position at which the tool feed should begin. In order to frictionally yieldably hold the carriage while tool traverse is taking place, and to prevent tool slide movement while carriage movement is taking place, the following described friction device is employed, in conjunction with the friction plate 56 and finger 101 carried respectively by the machine bed and traveller block 68.

Upon the carriage apron and disposed intermediate between the transmission control rod and the guide strips is a toothed wheel 102 rotatably mounted upon a stub shaft 103 projecting outwardly from the apron, (see Fig. 46). The toothed wheel is frictionally yieldably held against rotation upon a cylindrical boss on said shaft by friction discs 104 of suitable material placed at relatively opposite sides of the wheel, one between the wheel and the side of the apron and the other at the outer side of the wheel, as shown, the discs and wheel being held frictionally together by a spring pressed sleeve 106 having a flange engaged with the outer disc. The outer end of the sleeve is socketed and a spring 107 housed therewithin, which spring is compressively engaged by a washer and nut in threaded engagement with said shaft. In this instance, the wheel has three teeth, which are suitably spaced apart, two of which, respectively 105, 108, are adapted for engagement with the catch plate and the other 109 for engagement with the notch 101ª of the finger 101.

The uses and setting of the friction device will be hereinafter more fully described under the headings, "Setting of the machine for a turning cycle" and "Setting of the machine for a facing cycle".

*Control box construction and operation.*

The control box contains mechanism operable for obtaining appropriate feed screw movements to cause, in conjunction with the mechanism of the carriage, successive rapid traverse of the tool towards the work; tool slow feed towards the work; cutting feed of the tool to the end of the cut; friction feed to a positive stop; pause of the tool after the end of the cut is reached, to allow cut to run out; rapid traverse of the tool away from the work to full retracted position; and return of carriage to initial position.

For the machine shown two systems of transmission gearing are employed for rotating the feed screw. One for obtaining high speed results for reversible quick traverse of the carriage and tool slide, and which may be regarded as independent of the head stock gearing for rotating the spindle, and a second for slow speed results in transmitting connection with the head stock gearing through the lathe spindle.

The transmitting control for the feed screw is started manually, the hand lever control being such that the transmissions respectively for the two feed screws at opposite sides of the lathe can be operated either independently or simultaneously, the manual starting control operating a clutch for the high speed transmission and for use, as forward direction of rotation. After starting the transmission control is automatic, for obtaining a particular traverse cycle for the cutting tool, as to advance the tool from a starting position rapidly toward the work, thence under a slower or cutting feed in to the work, for depth cutting or facing and for turning after the tool has been slowly fed into the work a definite turning depth feed the tool at a cutting speed longitudinally of the work for the required and full turning length, and thereupon on any retreating action, retreat quickly from the work and return to a starting position.

The hand lever for starting control operates the trip rod or shaft 29 which subsequently is operated by the feed nut or propelling member upon the feed screw for translating the carriage and tool slide Manually shifting the trip rod or shaft 29 in an appropriate direction operates a fast feed clutch for throwing in the high speed transmission into connection with the feed screw for forward direction of drive. After starting, the control is automatic, power operated clutch controlling mechanism operating for throwing out the fast feed clutch and throwing in the slow feed clutch. The slow feed continues until the carriage or tool has moved or translated the required amount to operate the trip rod or shaft, whereupon the slow speed clutch is thrown out but with the slow feed continuing through a friction drive intermediate of the slow speed transmission and screw feed shaft operated by the trip rod or shaft in its movement for throwing out the slow speed clutch. This permits the feed shaft to be revolved until the cut completely runs out. The friction drive operates a cam which actuates the power operated clutch controlling mechanism for completing the power clutch control and release the control of the fast feed clutch for automatic operation and movement of the fast feed clutch for fast feed reverse to retreat the tool and carriage to its starting position whereupon the trip rod or shaft is again operated by the moving carriage or tool slide propelling member for throwing the fast feed clutch to its neutral position.

The transmission and controlling mechanism for the feed screw shaft is compactly organized and enclosed within a transmission casing or box mounted upon the lathe bed at the head stock end.

Within the box (see Figs. 5 and 6), disposed longitudinally thereof, all in parallel relation, are mounted five shafts; a drive shaft 110 coupled to the feed screw; a pulse friction shaft 111 intermittently rotatable by said drive shaft through suitable mechanism; a clutch shaft 112 colinear with the pause friction shaft, upon which are slidably mounted the traverse clutch and feed clutch forks; a traverse trip shaft 113 shiftable by suitable mechanism for throwing out feed and forward traverse clutches; and a shifter shaft 114 as an extension of the stop screw shaft 29, coupled with said shaft and operable thereby to actuate traverse and feed clutch forks respectively 116, 117, which forks in turn control the actuation of the forward and reverse traverse, and feed clutches respectively 118, 119. The drive shaft 110 is held at one end in a bearing at one side of the box and is counterturned and machined to provide an enlarged head end 120, having a socket 121 therein into which is adapted to be fit an extension 122 of the coupler shaft 123, which shaft is rotatively stepped in bearings in the side wall of the box, its outer projecting end being coupled with the feed shaft in a manner hereinafter described.

Upon the enlarged head 20 of the drive shaft 110 is keyed a sleeve 125 carrying circumferentially thereof a worm 126, and a spur gear 127. The feed worm gear 129 has an extension sleeve 128 which is rotatively journalled in the bearing 130, midway of the box, and rotatively engages the counterturned portion 131 of the drive shaft. The sleeve is thus rotatable upon the drive shaft and forms a support or bearing for said shaft. Set within a socket 132 in the side of the feed worm gear is a feed clutch ring 133 having clutch teeth thereon, said ring being non-rotatively attached to the worm gear by screws. Within this ring is disposed a flanged bushing 134ª, the flange being engaged against displacement between the back end of the ring 133 and against a washer placed within the socket.

Within the bushing surrounding and clear of the drive shaft, is rotatively mounted a friction ring 134 having the peripheral notch 135, into which notch extends the end of a pin 136 projecting from and rigidly held in the feed clutch 119, which clutch in turn is non-rotatively but translatively engaged with the longitudinal ribs 137 of the drive shaft. At one end of the ribbed portion of the shaft the same are counterturned to provide a shoulder 138 against which are engaged thrust washers, and upon the counterturned portion and against the washers is rotatively placed a bushed forward traverse miter gear 139. The shaft is further provided with an opposingly related reverse traverse bushed miter gear 140 rotatable upon a third counterturned portion of the shaft, and this portion is rotatably mounted within the bushed bearing 141. A drive miter gear 148 is in mesh with both gears 139, 140, said gear being attached to a shaft 149 mounted cross-wise of the box, and extending therebeyond at the back, and coupled with the power traverse gearing in a manner hereinafter described. The end of the drive shaft 110 is threaded, a nut is pinned thereto at the outer side, and abuts the casing, to prevent end play. The shaft between the two gears is longitudinally ribbed as at 142 and engaged with the ribs 142 is the traverse clutch sleeve 118 having teeth at its opposite ends capable of engagement with the corresponding teeth of the miter gears 139, 140. The sleeve is grooved and said groove is engaged by the yoke 145 of the traverse clutch fork 116 which has spaced projections 146, 147, alternately engageable by the finger 147ª of the starter shifter fork 148ª mounted upon the shifter shaft 114, and held from rotation thereon by a pin 148ᵇ projected into a slot 148ᶜ of said fork. The shaft 110 is in axial alignment with the feed screw shaft 29 with which it connects and may be referred to as an extension of said screw shaft. The worm gear 129 when connected with the shaft 110 through the clutch 119 constitutes the slow speed drive for the feed screw shaft receiving its motion from the head stock gearing of the lathe through the spindle and the bevel gears 139 and 140 the reversible high speed drive for the feed screw shaft receiving motion from the main drive of the head stock independent of the lathe spindle. The worm gear 129 can also be transmittingly connected to the shaft 110 and feed screw shaft through an intermediate friction transmission connecting worm gear 129 and spur gear 127 keyed on shaft 110 independent of the clutch 119, the friction transmission being utilized for continuing the screw feed shaft rotation after the clutch 119 has been thrown out to allow the tool to be fed to the full end of cut, and operate a power clutch control after the carriage or tool have been brought to the positive stop limits of the feeding traverse, enabling the work to be turned to approximately micrometer precision, under automatic control. This may necessitate a slight pause in the tool or carriage traversing cycle to effect a change of transmission, the friction drive yielding to any position resisting rotation of the screw shaft due to any dead stop limits encountered in the traverse of the carriage or tool, to avoid injury to the parts although permitting rotation to a clutch controlling cam. Therefore the intermediate friction transmission is herein designated as pause mechanism.

*Pause mechanism.*

Upon a counterturned portion of the feed worm gear sleeve extension 128, is keyed a sleeve spur gear 150 having the same pitch as the spur gear 127, upon the cam worm sleeve 125. The two gears 127, 150 are in mesh with toothed friction disks 155, said disks rotatively mounted upon lateral tubular extensions 156 of friction rings 157. The gear 150 is in mesh with four of the friction disks 155, while the teeth of the gear 127 are in mesh with one-half the number, or in this instance, two such disks, designated 155ª. The two disks act to drive the screw after the feed clutch is disengaged until the tool reaches the end of the cut, and the dead stop 200 is in contact with the control box. Interposed between the disks 155, 155ª, and the rings 157, is friction material 158, the same being attached in a suitable manner at each side of each friction disk. The friction disks have translative non-rotative connection with the longitudinal ribs 160 of the pause friction shaft 111, the said shaft being journalled at one end in a thrust bearing 161, against which bearing the last friction ring of the series abuts. Against the last friction disk 155ª, at the opposite end of the series of disks and rotatable with the pause shaft, is mounted a pause cam member 165, translatable upon the ribbed portion of the shaft and adapted to be forced against said disks, said member having the cam projection 165ª. The cam member is socketed as at 166 at the outer side, and the pause shaft counterturned to form a shoulder 167 lying within the socketed portion. A compression spring 168 encircles the counterturned portion and abuts a washer, which in turn abuts the socket wall of the cam member, when the spring is compressed, and the shoulder 167, when the clutch is disengaged and the spring self-contained. The opposite end of the compression spring 168 is engaged by a compression sleeve 169 slidably mounted upon the counterturned portion, said sleeve having a flange 169ª at its inner end within an opening of the control box wall. Rotatively mounted within the same opening, and concentrically engaged with and rotatable upon the sleeve 169, is the pause adjusting sleeve 170 having a projection 171 at its outer face, said face being further provided with bevel gear teeth 172 engageable with the corresponding teeth 173 of the pause index shaft 174, which is horizontally disposed in a bearing 175 at the side of the box. A pause index disc 176 is attached to the outer free end of the shaft 174, is keyed to the shaft, and has notches 177 in its periphery engageable by the circular end of a set screw 178 having screw threaded engagement with the bearing 175.

Abutting the end of the compression sleeve 169 and mounted upon a second and outer counterturned portion 180 of the pause friction shaft, is splined the pause catch collar 181 having a tooth 182 engageable with the projection 171 of the pause adjusting sleeve 170 as a result of which, when the pause adjusting sleeve is turned in a clockwise direction (see Fig. 12) the pause catch will be correspondingly turned and with it the pause friction shaft and pause trip cam: thereby adjusting the angular relation of the cam 165ª with respect to the pause trip block projection 185 of the block 184, against the torsional action of the coil spring 186 attached at one end to the pause cam sleeve as at 187 and at the opposite end with the frame as at 188. The pause cam is returned to its previously set initial position, when compression upon the spring is removed, by the torsional action of the coil spring 186, the pause adjusting sleeve being turned against the action of said spring. One member of a thrust bearing 189 is engaged against a shoulder of the pause catch 181, and the opposite element of the bearing is held within a sleeve 190 rotatively and slidably mounted upon the counterturned outer end of the pause shaft. This sleeve has a reduced hub extension, and a shoulder 191 is formed at the outer side. At the extreme end, the pause shaft is again counterturned and threaded, and a nut having threaded engagement therewith, is pinned thereto in a position to allow slight outward play between the outer end of the sleeve 190 and nut, a play sufficient to permit relief of pressure upon the spring 168. Between the nut and sleeve extension at diametrically opposite sides, are disposed shoes 193 projecting inwardly from the two-part pause lever 194, which lever is pivoted at one end as at 195 to the bearing or bracket 175, and has at its opposite extremity, inwardly projected shoes 196 adapted for engagement with one face 197 of the stop shaft coupling 198, and with the opposingly related face of a nut 199, in threaded engagement with and pinned to the stop screw shaft 29. When said shaft is thrown to the left, pressure is exerted upon the pause shaft sleeve by shoes 193, and thrust transmitted to sleeve, spring, and pause trip cam, to compress the friction disks and, during machine operation, to cause rotation of said cam.

The friction disks are under compression before the feed clutch is fully disengaged. Immediately upon the complete withdrawal of the feed clutch, but before the tool reaches the end of the cut, the two friction disks 155ª, through their connection with the sleeve, will cause continued rotation of the feed screw until the face 200 of the coupling 198 engages the side of the box; positively preventing any further movement and definitely determining the end of the cut. When the end of the cut has been reached, the disks 155ª will slip or idle, and the four disks 155 will rotate the pause shaft 111 and pause cam member 165, to subsequently engage the reverse traverse clutch when the cut has been run out. As soon as the friction disks are sufficiently compressed to overcome any non-rotative resistance upon the shaft 111 the shaft will be rotated, rotating the cam member 165, to bring its cam 165ª into engagement with the pin 185 of the slow feed clutch shifting element 184 for actuating the clutch controlling member 117. As the cam moves the clutch controlling mechanism a distance beyond that required for disconnecting the clutch 119 with the worm gear 129 for tripping the high speed clutch mechanism, and the cam moving comparatively slow, the friction drive is capable of transmitting motion to the feed screw with the gear 129 disconnected from the clutch 119 until a dead stop is reached. The pause shaft rotating less than a complete rotation and timed for the degree of revolution required to bring the cam 165ª from a starting position into operative engagement with the pin 185 of the clutch shifting element 184. It being recognized that after the cam has functioned for a transmission control the reverse high speed transmission is thrown in rotating the feed screw shaft in a reverse direction for retreat or return traverse of the carriage and tool slide. This being counter to the direction of the slow feed drive transmitted by the worm gear 129 a slipping of the friction disks will result until the compression is released.

The clutch forks 116, 117 are telescopically and interlockingly held in a positively limited relation, and a spring 201 is interposed between the forks for forcing the same away from one another in opposite directions. The degree of separation is limited by the relatively opposingly faced semi-circular abutments 202, 203. When either fork is moved toward the other the spring is compressed, conditioning that other, for operating its clutch upon the actuation or release of the proper mechanism. The traverse clutch fork 116, as before stated, has the extension 145 engaged within a circumferential groove of the traverse clutch 118, which clutch has teeth at relatively opposite ends, respectively for engagement with the corresponding teeth of the forward traverse miter gear 139 and with the reverse traverse miter gear 140.

Hold-out for feed clutch.

In order to positively maintain the feed clutch in unclutched condition when forward rapid traverse is taking place, the friction ring 134, rotatively mounted within and against the bushing held in the feed worm clutch ring, (see Figs. 6, 39 and 40), is provided in its periphery with the elongated notch 135 extending inwardly from the clutch side, said notch having a pocket 135$^a$ at one extremity merging into an outwardly slanting cam face 135$^b$, which face extends to the opposite side of the notch, the end walls of the notch forming the abutments 135$^c$, 135$^d$. Held in the feed clutch in horizontal position is the pin 136 having its end extending beyond and projected within the notch and adapted to engage the socket portion thereof when the feed clutch is engaged. The clutch 119 can not be shifted into engagement with the worm gear 129 when the clutch 118 connects with either of the high speed gears 139 or 140 as the rotation of the shaft 110 would be such as to establish and maintain the friction ring 134 in a position so that the pin 136 in the notch in the ring would hold the clutch 119 out. The rotation of the shaft 110 must be reduced or stopped to permit the ring to be influenced by the rotation of the gear 129 to advance the notch so that the pin 136 can be engaged in the pocket 135$^a$. When, however, the forward traverse clutch is in, and the feed clutch has been disengaged, said clutch will be positively held out of engagement with the teeth of the feed worm gear clutch ring, for the reason that when the forward traverse clutch engages, the rotative speed of the drive shaft, and feed clutch keyed thereto, is increased over that of the feed worm rotation, and the pin is held in engagement with the forward abutment 135$^d$ and rests upon the inclined face 135, thus holding the clutch in unclutched position. The cam ring, being frictionally rotatively mounted, will rotate with the disengaged feed clutch when the pin 136 is engaged with the forward abutment or shoulder 135$^d$.

Feed and traverse latch mechanism.

The traverse clutch fork is forcibly but yieldably locked in forward traverse clutch and feed positions by latch mechanism, in the following manner: (see Figs. 5, 7, and 8). A lever 210 is pivoted centrally of its length to the frame as at 211. Each arm of the lever has a pin projecting inwardly therefrom, each pin spaced an equal distance from the pivotal point of the lever. The upper pin 212 is, under certain conditions, engageable with the inner face 213 of the flange of the sleeve 214 rigidly attached to the traverse trip shaft, and acting as a bearing, slidable in the box wall. The lower pin 218 has a block provided thereon, which block is slidably engaged between the spaced projections 219 of the traverse clutch fork 116. The lower end of the lever 210 is provided with two notches, respectively herein designated as forward traverse notch 220 and feed notch 221, each alternately engageable with a spring pressed pawl 222, pivoted as at 223 to the box wall. When the feed notch 221 is in engagement with the pawl, the spring 201 is compressed and the feed clutch is engaged. When the forward traverse notch is engaged with the pawl, the traverse clutch is engaged with the forward traverse miter gear 139. When the shifter shaft 114 is moved to the right at the commencement of a cycle, the finger 147$^a$ of the starter shifter fork 148$^a$ engages the projection 147 of the clutch fork 116, moving it to the right until the traverse clutch is engaged with the forward traverse miter gear. The block on the pin 218, being slidably retained between the projections 219, is carried to the right, also moving lever 210, so that at the time the clutch is engaged the forward traverse notch is in engagement with the pawl. The upper pin meanwhile has engaged the inner face 213 of the flange of the sleeve 214, attached to the traverse trip shaft 113, moving it to the left and with it, by abutting engagement with the nut 265, sleeve 264, yoke 262, trip block 184, feed trip block 270, sleeve 275, and finally feed clutch fork 117, thereby withdrawing the feed clutch, and conditioning pin 136 for engagement with the inclined face 135 of cam ring 134. By this same movement, traverse trip lever 260, as a result of the engagement of pin 261 with projection 262ª of yoke 262, has been positioned for engagement with traverse trip cam 252. As the traverse trip cam 252 engages, the traverse trip lever pin 261, by its slow movement, gradually throws the said lever toward the right, the face 213 engages the pin 212, and the forward traverse notch 220 is gradually withdrawn from engagement with the pawl, and the feed notch 221 approaches and engages the point of the said pawl. This engagement takes place after the forward traverse clutch is thrown out, and continues while feed continues. The feed notch in turn is withdrawn from engagement with the pawl, positioning the lever, as shown in Fig. 5, when the dead stop 200 of the stop screw shaft engages the side of the box, as shown in Fig. 6, at which time all clutches are disengaged. At this period the lever 210 assumes the position shown in Fig. 5, its left end being engaged with the upturned end 225ª of the spring pressed latch lever 225 pivoted as at 223. The latch lever 225 will hold the lever 210 in the position shown, with all clutches disengaged, until the cut has run out, at the end of which period the pause cam 165ª will throw the feed clutch 117 to the left and the pin 226 thereon will engage the upstanding end 227 of the latch, tilting the same and releasing the lever 210, after which the spring 201 will throw the clutch 118 into engagement with the return traverse miter gear. The projection 147 will then be in engagement with the starting finger projection 147ª so that, as the carriage approaches its initial position, traverse clutch 118 will be gradually withdrawn and the clutch put in initial position, as shown in Figs. 6 and 17.

The spacing of the projections 146 and 147 of the clutch shifting member 116 provide for lost motion between the finger 147ª of the shifting member fixed on the rod 114 to permit the shifting member to be moved to engage the clutch member 118 with the reverse gear 140 when the latch 225ª has been depressed. The trip rod 114 being at the limit of movement in a forward or one direction.

*Forward traverse throw-out mechanism.*

Mounted at right angles to the traverse trip shaft, and above the same and stepped in bearings at opposite sides of the box, is a shaft 230, herein called the traverse worm wheel shaft, which is rotatively disposed in its bearings. (See Figs. 5, 9 and 29.) Upon the shaft at the inner end is keyed a spacing sleeve 240 which engages the bearing. The sleeve abuts a shoulder formed by counter-turning the shaft. Abutting the inner end of the sleeve is the spiral gear 241 in mesh with the spiral gear 126 of the drive shaft. The spiral gear 241 has a sleeve extension at each side and the forward sleeve extension is clutched by notches 242 and projection 243 to the sleeve extension of the traverse cam clutch member 244, said clutch member having an enlarged flanged portion provided on one face with radially disposed clutch teeth 245, cooperating with corresponding clutch teeth 246 of the traverse adjusting clutch member 247 non-rotatively attached upon the cam adjusting sleeve or bushing 248 in turn rotatable and slidable upon the shaft. The traverse adjusting clutch member 247 has a sleeve extension non-rotatively clutched by projection 250 and notches 251 to the traverse trip cam 252, which cam is also keyed to the cam adjusting sleeve or bushing 248. The traverse trip cam 252 abuts a shoulder of the bushing 248. The outer portion of the bushing is enlarged and is rotatively mounted in the bearing 253. The outer enlarged end of the bushing extends beyond the box wall to form a knob M, which knob is provided with exterior graduations 254 registerable with a mark 255 upon the box. The outer end of the shaft 230 is reduced and threaded, and a washer and jamb nut 256 placed thereon. Thus the adjusting sleeve 248 traverse trip cam 252 and adjusting clutch member 247, as a unit, may be translated and rotated upon the shaft to connect, disconnect and change the angular relation between the two clutch members. By loosening the nut, the trip cam may thus be adjusted to any desired angular relation with respect to the traverse trip lever pin 258, to cause the cam to travel for a predetermined period of time before engagement with said pin, which period corresponds to that of rapid traverse of the tool to feed position. Pivoted at the bottom of the casing as at 259 and extending upwardly parallel with and spaced from one front vertical side is a traverse trip lever 260 having a shifter pin 261 adjacent its upper and extending laterally therefrom and engaged between the fingers 262ª of the traverse trip yoke 262. At the upper end of the lever is disposed the traverse trip pin 258 which may be adjusted and held in adjusted position by a set screw. The traverse trip yoke 262 lies abuttingly between the pause trip block 184 and a bearing sleeve 264 keyed to the traverse trip shaft and to the box wall, the outer end of said sleeve being engaged by a nut 265 which is pinned to the shaft. When the traverse trip lever is thrown to the right the shaft will be correspondingly thrown. The trip block 184 is held against rotation by the headed pin 267 projecting from the front wall of the box into a groove 268 of the block. Locked to the trip block 184 and slidable on the traverse trip shaft is the feed trip block 270, having the projection 271 engageable by the feed trip dog 272, mounted non-rotatively upon a transverse stub shaft 273 journaled in the front wall of the box (see Figs. 5, 9 and 11). The shaft 273 has attached at its outer extremity, outside of the box, a feed-cut-out lever A having a latch pin *a* engageable with two openings, respectively *b*, *c*, in a latch plate *d*, the pin being engaged with the opening *b* when the lever is positioned as shown in dot-and-dash lines in Fig. 5. By pulling the lever to the right to the position marked X the feed clutch may be withdrawn. The lever may be moved to position marked Y in order to trip latch lever 227 and so release latch 225ª and let return traverse clutch in should it be required to return to starting point some time during a cycle. There is, however, no opening in latch plate corresponding to this position.

The feed clutch fork 117 is locked to the feed trip block 270 by the coupling 275 so that said feed trip block and clutch will move in unison. Projecting horizontally through a flange of the fork 117 is the adjustable, threaded pin 226, the one end of which is adapted for engagement with the end 227 of the latch 225, which latch has its outer upturned end 225ª engaged with the lever 210 during the pause at the end of the cut and after the feed clutch has been withdrawn. When the pause cam throws the pause trip block 184 to the left, the pin 226 will engage the latch, release the latch lever 210, and spring 201 will force the reverse traverse clutch in.

Control levers.

Disposed cross-wise of the machine, and across the ends of both control boxes near the bottom thereof, is a starting shaft 280, (see Figs. 5 and 10), held in suitable bearings 281, one bearing on each box. This shaft is provided at each end with a handle F, which handle is keyed to the shaft. By operating either handle, the operation of the mechanism of both boxes may be simultaneously controlled in the following manner:

Surrounding the starting shaft 280, traversing the bearing 281 and rotative therewithin is the sleeve 284, said sleeve extending through and projecting beyond the bearing at each side. Two sleeves are provided, each rotatable in its respective bearing and upon the starting shaft. Upon the outer side of each sleeve is keyed a starting lever B, and at the opposite end of the sleeve is keyed a shift lever 285, having a projecting shoe 286 which engages in a groove 287 of the stop screw shaft coupling 198. The handles of the levers B are in the same rotative plane as the corresponding levers F, and the levers have stops $F^1$, $B^1$, which are engaged when either pair of levers are in inoperative position, as shown in Fig. 2, or when lever F is pulled from the position shown. The lever F also has a stop $F^2$ which is engaged with the projection 290, as an extension of the pivot 259, when said lever is in operative position. By this arrangement the lever B may be pulled independently of the lever F, and, when so pulled, will start operation of the carriage on that side of the machine. When, however, either of the levers F are pulled, the projections $F^1$, $B^1$, of the levers being in abutting relation, both levers B will be pulled, thus correspondingly moving the stop screw shafts at both sides of the machine, and the mechanism at both sides will operate. The shift lever shoe 286, being engaged with a groove in the stop screw shaft coupling, will operate to translate the stop screw shaft and operate the starting shifter finger 147ª.

Safety coupling connection between drive and feed screw shafts.

Rotatively stepped in the wall of the box is a short coupler shaft 123 colinear with drive and feed screw shafts, said coupler shaft having a reduced extension 122 engaged with the bore 121 of the head 120 of the drive shaft. (See Figs. 6-15). The shaft 123 has pinned thereto a shouldered sleeve 300 having the projections 301 engaged with corresponding notches of the cam worm sleeve 125. Upon an extension of the sleeve is mounted one element of the thrust bearing 302, the opposite element of which is engaged with the side wall of the box. The stub shaft is threaded as at 303, and upon the threaded portion is locked a thrust ring 304 against which is engaged one element of a ball bearing 305, the opposite element of which is held in a socket in the control box wall. The shaft is further provided, adjacent its outermost end, with the shouldered castellations 306 having a ring 307 engaged therewith and against said shoulders. Between the bearing 305 and said ring is interposed a fabric washer as means for preventing oil leakage. The outer end of the shaft 123 is left-threaded as at 308, and said threads are engaged with corresponding interior threads of a flanged sleeve 309, the flange 310 of which is engaged with the face of the ring 307. The threads of the sleeve 309 also engage the corresponding threads 312, on the reduced end of the feed screw shaft, and said sleeve is pinned to the shaft as at 313. Opposingly disposed, respectively in the ring 307 and flange 310, are the bushings 315, and traversing said bushings is a pin 316. A plurality of such pins and bushings are equally spaced, circumferentially, to hold the disc and sleeve flange rotatively together. The pin construction is in the nature of a safety device, whereby when undue strain is put upon the connected parts, the pins 316 will break, the drive shaft will continue to rotate while the feed screw shaft remains at rest and the rotation of the screw threads 308 will force the sleeve 309 and feed shaft pinned thereto towards the right and release the tool, to prevent breakage of the same.

Power transmission.

In order that the tool units may be caused to operate selectively and simultaneously, or alternately upon a given piece of work from opposite sides thereof, common traverse and power gearing connection with both control boxes is necessary. The transmission means consists herein of a rapid traverse gear train and a spindle gear train, operated from a common shaft. Only the main elements of the trains will be referred to by reference numerals. The gearing is supported on suitable shafts, detailed description of which is herein omitted for the sake of brevity and clearness.

The power is in this instance procured through a pulley 319 mounted upon the pulley shaft 320 supported in a suitable bearing casing 321 attached at the upper rear end of the head stock. A gear 322 upon the inner end of the pulley shaft is engaged with the corresponding gear 323 mounted upon the shaft 324 in the head stock casing. From this shaft the head stock gearing and the rapid traverse gearing receive motion, the rapid traverse being connected through the gear 325, shaft 326, and gear 327.

Power to spindle and feed worm is transmitted in the following manner: The gear 328 on the shaft 324 meshes with the gear 330 on the shaft 331. Slidably mounted also on the shaft 331 is a cluster gear 332 one of a cluster composed of three gears shiftable for cooperation with gears 333, 334, and 335, upon the shaft 336. Centrally of the gears 334, 335 is a gear 337 meshing with the back gear 338 upon the spindle 339. Levers are provided at each outer side of the head stock casing, each journaled on suitable shafts, the lever E for shifting the cluster gears for speed change; the lever G for throwing out the spindle clutch 340; and the lever I for operating the pulley clutch through connecting rod 341 and lever 342, said clutch not herein shown. Attached to the rear end of the spindle is a helical gear 345 in mesh with a companion helical gear 346 mounted upon a cross coupling shaft 347, which shaft is suitably coupled as at 348, 349, respectively with the front and rear auxiliary feed drive shafts 350, 351. The shafts 350, 351 are identical in construction and each is mounted in the upper part of its respective control box (transversely of the box and at right angles to the shaft hereinbefore described. Inasmuch as the connections between the feed drive shaft and the worm shaft are identical, the description from this point will refer to the gearing connections in one of the boxes only, the front.

Attached at the outer end of the shaft 350 is a spur gear 352, which may be a change gear. The change gear 352 is in mesh with a second change gear 353 keyed to a bushing rotatable upon a stud shaft 354, which is held rigidly in a bearing 355 at the front wall of the box. Keyed to the same bushing and spaced from the gear 353 is a second gear 360, which gear is in mesh with the gear 361 keyed at the outer end of the worm shaft 291. The worm shaft is suitably mounted in aligned horizontal bearings 292, 293, (see Fig. 8). Upon said shaft is keyed the sleeve 294 having the worm 295 thereon meshing with the feed worm 129. A thrust bearing 296 is interposed between a shoulder upon the sleeve 294 and the back bearing 293. The rotation of the worm 295 is in the same direction and the bearing 296 receives and sustains the thrust submitted to the shaft.

The power traverse train consists of gears 375, 376, 377, said gears being mounted upon suitable shafts supported in the rapid traverse gear casing 378 at the back of the head stock casing. The gear 375 is in mesh with the gear 327 and the gear 377 is mounted on a sleeve rotatable upon a stub shaft 380. This sleeve has at its outer end a miter gear 381 in mesh with companion miter gears 382, 383, keyed to respective shafts 384, 149, said shafts being held in suitable bearings in a casing 386 attached at the rear of the control box. The stub shaft 384 is connected by coupling member 390 with the drive shaft 149 rotatively held in a suitable bearing at the rear of the control box, and having at its inner end the drive miter gear 148 meshing with both traverse miter gears 139, 140. Interposed between the miter gear 148 and its bearing is a helical gear 391 in mesh with a companion gear 392 upon a vertical oiler sleeve 393. The improved oiling device will be made subject matter of a separate application.

The drive miter gear shaft 149 having the gear 383 at its outer end, extends through the rear side of the rear control box and has on its opposite end the drive miter gear 148 meshing with the gears 139, 140, and interposed between this gear and the bearing is a helical gear 391 connected with a companion helical gear 392 of the oiler sleeve 393.

The above described arrangement of power, in conjunction with the mechanism of the feed boxes, provides for operation of the feed screws simultaneously or relatively intermittently, and also provides means whereby the feed screws may be simultaneously operated at different speeds, as by the use of change gears. Each screw may be stopped, reversed, and made to feed or rapid traverse in forward or reverse directions independently of the other, making possible the timing of the tools operating at relatively opposite sides of a piece of work, in such manner that one tool may approach the work at one rate of speed, make a cut, and pause while the opposite tool performs a similar or different operation upon the piece, the operation being automatic from the time they are initiated until, after completion of the work, the carriages are returned to the starting point with the tool slide in retracted position.

*Setting of machine for a turning cycle.*

A test piece T, (see Fig. 17) having been properly positioned between the head and tail stock centers, the forward traverse throw-out clutch members 244, 247, are disengaged from one another by loosening the nut 256 and pulling the knob M outwardly. This operation leaves the traverse trip cam 252 in inoperative condition. The feed screw is then rotated by the hand-wheel H and the carriage moved to the position it should occupy when it comes to rest after having completed a turning cycle. With the carriage in this position and the slide retracted, the notch 57 of the friction or trip plate 56 is put in mesh with the friction finger or tooth 105 of the wheel 102, the friction tightened and the trip plate then bolted immovably to the frame. With the traveler or trip block 68 against the carriage stop plate 80 the nuts 31 on the stop screw are adjusted against the stop screw sleeve 31ª, after this sleeve has been adjusted with its left end against the right end of the traveler block. In this position the stop screw shaft is thrown such a distance to the right as will put the clutch 118 in neutral position. The screw is now again turned in feeding direction and the slide brought forward until the point of the tool T is at that position where rapid traverse should stop and feed begin, (see Fig. 18). The zero mark on the traverse trip cam setting dial is now made to coincide with the zero mark 225 on the box, setting the trip cam 252 in such position as will at the proper time automatically engage the lever 260, throw out the forward traverse clutch and throw in the feed clutch to feed the tool towards the work more slowly and thereafter to feed tool and carriage to the end of the cut. The feed screw is now operated to bring the point of the tool against the test piece (see Fig. 19), the point of the tool then being in a position corresponding with the finished diameter of the work. With the tool in this position, the apron stop sleeve S is set against the traveler block 68 and locked. Further movement of the feed screw in feed direction will translate the carriage and tool lengthwise of the bed towards the headstock until the tool has reached the end of the cut. With the tool at the end of the cut (see Fig. 20), the nuts 32 on the stop screw shaft are engaged with the traveler block and forcibly screwed against the same until the said shaft is moved a sufficient distance to the left to bring the dead stop 200 forcibly against the control box. The degree of pause of the tool while the cut runs out being known, the adjustment therefor is now made by withdrawing the screw 178, and for the shortest pause, turning the collar 176 to the right to its limit of rotation in that direction, and then replacing the screw in the nearest notch. The pause may be increased from this point by turning the collar to the left the desired number of notches, and locking. With the carriage and tool in the position above mentioned, all clutches are disengaged and the pause friction discs are under the greatest compression, the mechanism being conditioned for throwing in return traverse when the cut runs out.

The machine may now be started by the pulley lever I, which causes worm wheel rotation; the pause cam will rotate, throw the traverse trip shaft to the left, release the latch lever 210 (see Fig. 5), and return traverse will automatically take place. The pause cam under these conditions is operated as a result of the rotation of the feed worm, sleeve, and gear keyed to the sleeve, said gear being in mesh with the pause friction discs which are at this time under full compression.

*Turning operation.*

With the work properly set and the carriage in starting position, with the slide retracted, (see Fig. 17) the machine is started by operating the pulley lever I which causes feed worm and traverse miter gear rotation. The feed cut-out lever A is now released and positioned as shown in Fig. 5, to allow subsequent shifting of the traverse trip shaft to the right, at the proper time, by the traverse trip cam to throw in the feed. The lever B is pulled to the extreme right, causing the forward traverse clutch to engage and the feed clutch to disengage, at which time the forward traverse notch 220 of the latch lever engages the pawl. Under these conditions the feed clutch is positively held out because of the engagement of the pin 212 with the inner face of flange 213. The tool is now traversed inwardly toward the work, and the traverse throwout cam 252 begins to rotate. When the tool is traversed to the finished diameter, or approximately to the finished diameter, the traverse cam 252 engages and throws the traverse trip lever to the right, correspondingly translating the traverse trip shaft pulling the forward traverse clutch out, allowing the pin 136 to rest on the inclined face 135 of ring 134, where it holds the feed clutch in unclutched position until the forward traverse clutch is entirely disengaged, after which this device allows the feed clutch to engage. At this time the feed notch 221 of the latch lever is engaged with the pawl. The tool and carriage are now fed together almost to the end of the cut, at which time the feed clutch is pulled out, but the rotation of the feed screw is continued by means of the friction disks 155$^a$, until the cut has run out and the dead stop 200 engages the side of the box. The feed worm sleeve continues to rotate, and through its geared connection with the friction disks, effects a rotation of the pause cam, which rotation continues until the pause cam engages the projection of the traverse trip block 184, throws the same to the left, transmitting motion to the trip clutch fork which trips the trigger 245 releases the latch lever and allows the spring 201 to force the clutch 118 into engagement with the clutch teeth of the gear 140, reversing the rotation of the feed screw, returning the carriage to its initial position, and pulling the stop screw shaft again to the right sufficiently to release the return traverse clutch (see Fig. 17).

At any time during the feeding operation, the feed may be discontinued by pulling the lever A to the right and locking the same in that position, which operation disengages the feed clutch without tripping the trigger 225, and holds said clutch out, (see Fig. 5).

*Setting of the machine for a facing cycle.*

The test piece T', having been properly positioned (see Fig. 47) the feed screw is rotated by hand and the carriage moved to a position which it occupies when it comes to rest after a facing cycle. With the carriage in this position the notch 101$^a$ of the friction finger 101 is set in mesh with the tooth 109 of the wheel 102, and the plate 56 on the bed placed within a short distance of the lower finger 108. In this instance the trip plate is reversed, as shown, and its rear end used as an abutment. After setting as above described the nut is turned and friction applied to the wheel 102. The sleeve 31$^a$ is brought against the traveler block and locked by the nut 31. The screw is then again turned by hand, to translate the carriage along the bed until the point of the tool is in line with the finished face of the work (see Fig. 48). The stop screw S is wound out until the same is against a boss on the control box, or against an attachable extension stop J, (see Fig. 15). The stop screw S is then locked. The feed screw is again rotated to move the traveler block and slide to that position where rapid traverse should cease and feed begin. The zero mark on the knob M is then set to coincide with the mark on the box, and locked, in a manner similar to that of a turning cycle. By continuing the screw rotation the tool is made to travel across the face of the work until the end of the cut is reached, (see Fig. 49) at which time the nuts 32 are forced against the traveler block, translating the stop screw towards the left until the dead stop 200 is tight against the control box. The nuts 32 are then locked. Upon starting the machine return traverse will come into action and the carriage will be returned to the starting point. After setting the machine as above described, the work to be faced is substituted for the test piece, and the machine started by releasing the feed cut-out lever A, and pulling the lever B to the extreme right as in the case of a turning operation.

The wheel 102 and teeth thereon, in conjunction with the elements 56 and 101, provide means whereby the carriage may be held stationary while the tool slide moves, and whereby the tool slide may be held stationary while the carriage moves, procuring positive action between the tool slide and carriage.

In Figures 51 to 56 inclusive, is shown a modification of the pause cam member and related parts. In this form, the sleeve 275$^a$ acts as a spacing member only; the feed clutch fork 117$^a$, and feed trip block 270$^a$ being non-attached thereto and therefore independently movable. The pause trip block is dispensed with, and the feed trip block is transversely notched to form a shoulder 400, against which the shoe 401 of the pause cam lever 402 engages. The shoe 401 is held upon a pin 403 of the lever, and said lever is pivoted as at 404 to swing horizontally, between lugs 405 integral with a circular support 406 disposed and centered within an opening in the front wall of the control box, wherein said support is held by screws 407. The shoe 401 may also engage the inner face of the traverse trip yoke 262. Aligned with, and below the pin 403 is a pin 408 adapted for engagement by the cam projection 165$^h$ of the pause cam member 165$^c$. This cam projection is a modified elongated form and is capable of cooperation with the pin 408 at whatever position it may occupy. In the first described form, the cam projection was only engageable with the pause trip block projection 184 when the same was virtually in a single position. The elongation of the cam permits positive engagement with the pin 408 whatever the position of the lever 402.

When the cam member is rotated, and the cam engages the pin, the feed trip block and feed clutch fork 117$^a$ are forced to the left, and the pin 226 engages and releases the latch 225, allowing the reverse traverse clutch to go in, as previously described.

In Figures 57 to 61 inclusive, is shown a modified form of safety device as a part of the feed train. In this form of the invention, the safety coupling connection between the drive and feed screw shaft is dispensed with, and a safety clutch is provided upon the feed worm shaft 291, as a part of the feed train, which clutch will disengage when undue strain is applied to the feed mechanism. As shown in Figure 57, the short coupler shaft 123ª is suitably shouldered and supported in bearings in a manner substantially similar to the above described for the first form of the invention, but has the outer projecting end pinned as at 308ª, to the sleeve 309ª. The sleeve 309ª is pinned as at 313 to the feed screw shaft, thus solidly connecting or coupling said shafts.

The feed worm shaft 291 is mounted in its bearings in a manner substantially similar to that before described, (see Figs. 8 and 58), except that the inner end of the shaft is held in a bushing 416, of slightly greater width than the bearing, 293, beyond which bearing the sleeve extends at each side. The shaft 291 is counterturned to form a shoulder 417, and against this shoulder is a collar 418, which surrounds the counterturned portion of the shaft and abuts the inner projecting end of the sleeve 416. The outer end of the shaft has fixed thereto a nut 419, which also abuts the outer end of the sleeve. The bushed feed worm sleeve 294ª is rotatively mounted upon the shaft, and shouldered at its inner end for engagement with the thrust bearing 296, and is provided at its outer end with clutch teeth 420 engageable with corresponding teeth 421 of the clutch element 425 keyed as at 426 to the shaft 291 between the worm sleeve and the front bearing 292. Sufficient sliding play between the end of the sleeve and the bearing 291 is provided for disengagement of the clutch teeth.

The teeth of the clutch 425, and the companion teeth of the sleeve are designed to slip over one another when undue strain is brought to bear upon the feed mechanism, the degree of pressure opposed to such slippage being governed by the tension of the coiled spring 427, surrounding the clutch, abutting the flange 428 and collar 429. The collar 429 in turn abuts the shoulder 430 of the shaft, and is spaced away from the bearing 292, as shown. The thrust of the spring is thus self-contained between the shoulder 430 and nut 419, through sleeve 416 and collar 418. The thrust bearing 296 only receives the load of the feed drive worm.

Power is transmitted through gear 361 to the shaft 219 which drives the clutch 425. In case of overload, the clutch teeth 416 will ride up the inclined surfaces 420ª of the worm sleeve and slip out of engagement, causing a "click" as a warning to the operator, which will continue until excess load has been relieved.

In Figures 62 to 66, inclusive, is illustrated a modified form of pause cam setting and returning device. In this form of the invention, the pause cam member 165ª is of substantially the same form as that first described, occupies the same position, and performs the same function. The structure and operation of the modified means for adjusting the angular relation of the cam projection relative to the pin 408, and for returning the projection to its previously set initial position is as follows:

The inner end of the pause friction shaft 111 is bored as at 435, and engaged within the bore and pinned as at 437 therein is a counterturned end 436 of a shaft 438, which shaft loosely traverses a bore of the clutch fork shaft 112, and projects therebeyond at the rear of the control box. The outer end of the shaft 112 is extended as at 440 to form a bearing, upon which is rotatively mounted a sheave 450 having a stop lug 451 cast integral therewith, upon its inner face, which lug is adapted to engage with a corresponding stop pin 452 held in the end wall of the box. Non-rotatively pinned to the outer end of the shaft 438 is a pause adjusting segment or index element 455, having a circular boss 456 rotatable within the bore of the sheave 450. The index element is of substantially triangular configuration, being pointed at one end, said end being provided with a mark 456 registrable with radial graduations 457 upon the face of the sheave. The element is provided at its opposite end with a circular slot 458 concentric with the axis of the shaft 438, through which slot projects a clamping screw 459 having threaded engagement with the sheave. The sheave has attached thereto by means of a pin 460 and chain 461, a counterweight 467, the lower end of the chain being attached to a cushion device disposed within the weight, and comprising a slidable rod 462 having a fixed collar 463 at its lower end, said collar being slidable in the socket 464. A compression spring 465 is interposed between said collar and a collar 466 abutting the socket wall and loosely traversed by the rod.

In setting the device the clamping screw 459 is loosened, and the index element turned to bring its mark 456 in position to that graduation, which will set the cam projection in the desired angular relation to the pin 408, after which the element is clamped for movement with the shaft and sheave.

During operation as the tool nears the end of the cut, the traveler block engages the stop screw shaft and moves said shaft to the left, compressing the spring 168 and causing the cam and shaft 438 to rotate against the action of the counterweight 464. This rotation continues until the cam projection 165ᵇ engages the pin 408, which moves to the left, thereby moving the clutch fork and disengaging the latch 227, and throwing in the return traverse clutch. The spring 168 is under compression before the feed clutch is entirely disengaged. When the clutch is completely withdrawn, the rotation of the feed screw is continued by means of the friction disks 155ᵃ until the dead stop 200 comes into contact with the control box, thus stopping all further movement of the tool. The cam 165ᶜ is therefore thus rotating toward the pin at the same time that the friction disks are drawing the dead stop against the box. From the time that the dead stop comes into contact with the box, and the tool stops moving, until the cam allows the traverse clutch to go in, the tool pauses for the cut to run out. The rotation of the shaft 111 and rod 438 causes rotation of the sheave against the action of the counterweight. After the return traverse clutch is engaged, pressure upon the spring and friction clutch is released, and the weight returns the cam projection to its initial position, which is accomplished when the lug 451 engages the pin 452, thus setting the cam projection in its initial position.

It will be obvious that if the point to which the cam is returned after its operation be made adjustable, the length of the pause will be varied. The sheave always returns to the same point, and therefore by changing the angular relationship of the adjusting segment to the sheave, the point to which the cam is returned is changed. The modification relative to the pause cam member and related parts as shown in Figure 66, conforms to that of the modification of those elements previously described. Figure 66 shows the relation between the drive shaft 110, pause friction shaft 111, and traverse trip shaft 113, as well as the relation of the cam lever to the feed trip block.

Having described our invention, we claim:

1. In a machine of the class described, a rail, a carriage translatable thereon, a carriage propelling member adapted for carriage propelling and non-propelling engagement, a feed shaft connected with said propelling member, a control shaft operable by said propelling member, transmission and clutch mechanism for rotating said feed shaft, and means operatively connecting said control shaft and transmission and clutch mechanism.

2. In a machine of the class described, a rail, a carriage translatable thereon, a carriage propelling member adapted for carriage propelling and non-propelling engagement, a feed shaft connected with said propelling member, a control shaft operable by said propelling member, selective transmission and clutch mechanism for rotating said feed shaft, and means operatively connecting said control shaft and selective transmission and clutch mechanism.

3. In a machine of the class described, a rail, a carriage translatable thereon, a carriage propelling member translatable within said carriage, adapted for abutting engagement therewith, a driven feed shaft connected with said propelling member, a shiftable control rod translatable by said propelling member, selective mechanism for rotating said shaft, and means operatively connecting said control shaft and selective mechanism.

4. In a machine of the class described, a rail, a carriage translatable thereon, a carriage propelling member within said carriage, a driven feed shaft for operating said propelling member, a control rod having abutments thereon engageable by said propelling member, selectively operable transmission mechanism for rotating said shaft, and means operatively connecting said control rod and transmission mechanism.

5. In a machine of the class described, a rail, a carriage translatable thereon, a carriage propelling member translatable within said carriage and adapted for carriage translating and non-translating engagement, a screw shaft connecting with said propelling member, a control rod engageable by said propelling member, transmission mechanism for selectively rotating said shaft for rapid and slow speeds in forward and reverse directions, and means operatively connecting said control rod and transmission means.

6. In a device of the class described, a rail, a carriage translatable thereon, a carriage propelling member translatable upon said carriage adapted for abutting and non-abutting engagement therewith, a screw shaft in threaded connection with said propelling member, a shiftable control shaft having adjustable abutments thereon engageable by said propelling member, cooperable transmission and clutch mechanism for selectively controlling rotation of said shaft at various rates of speed in forward and reverse direction, and means operatively connecting said control rod and clutch whereby the engagement of the propelling member with said abutments actuates said clutch means.

7. In a machine of the class described, a rail, a carriage translatable thereon, a carriage propelling member movable within said carriage and adapted for abutting and non-abutting engagement therewith in relatively opposite directions of movement, a screw shaft connected with said propelling member, a rod loosely traversing said member having abutments thereon engageable therewith at relatively opposite sides, transmission means selectively operable for rotating said shaft, and means connecting said control rod and transmission means whereby engagement of the propelling member with said abutments actuates said rod for controlling said transmission means and movement of said carriage.

8. A lathe, having rails at opposite sides thereof, a carriage translatable upon each rail, a carriage propelling member translatable within each carriage, and adapted for carriage propelling and non-propelling engagement, a screw shaft connected with each propelling member, a shiftable control shaft translatable by each propelling member, independent selective transmission mechanisms for rotating each screw shaft, means operatively connecting each control shaft and corresponding transmission mechanism, and a common power shaft having transmission connection with the selective shaft transmission mechanisms.

9. A lathe, having feed screws at relatively opposite sides, selective mechanisms for rotating each screw in reverse directions, a power shaft, a spindle, intermediate transmission connection between said power shaft and spindle, and transmission connection between said spindle and selective rotating mechanisms and between said intermediate transmission connection and said selective rotating mechanisms.

10. A lathe, having feed screws at relatively opposite sides, selective feed and selective forward and reverse traverse mechanisms automatically controllable for intermittently and alternatively operating each screw, a power shaft, a spindle, intermediate transmission connection between said power shaft and spindle, between said intermediate transmission connection and said selective traverse mechanisms, and between said spindle and selective feed mechanisms whereby said mechanisms may be alternately or simultaneously operated.

11. A lathe, having feed screws at relatively opposite sides, selective feed and selective forward and reverse traverse mechanisms automatically controllable for intermittently and alternately operating each screw, a power shaft, a spindle, intermediate transmission connection between said power shaft and spindle, between said intermediate transmission connection and said selective traverse mechanisms, and between said spindle and selective feed mechanisms whereby said mechanisms may be alternately or simultaneously operated, and independent manually operated means for rendering automatic operation inactive and permitting manual control.

12. A lathe, having feed screws at relatively opposite sides, selective feed mechanism and selective traverse mechanism automatically controllable for intermittently and alternately operating each screw, a power shaft, a spindle, intermediate transmission connection between said power shaft and spindle, and between said intermediate transmission connection and said selective traverse mechanisms, and transmission connection between said spindle and selective feed mechanisms whereby reverse rotation of said screws may be alternately and simultaneously obtained, while constant speed ratio between said spindle and feed mechanism is maintained.

13. A lathe, having opposite parallel rails, a carriage translatable upon each rail, a carriage propelling member for each carriage adapted for carriage propelling and non-propelling engagement, a feed screw connected with each propelling member, selective feed mechanism and selective traverse mechanism for intermittently and alternately operating each feed screw, a control rod for each propelling member, operable thereby for controlling respective feed and traverse mechanisms, a power shaft, a spindle, intermediate transmission connection between said power shaft and spindle and between said intermediate transmission connection and said selective traverse mechanisms, and between said spindle and selective feed mechanisms, whereby said mechanisms may be alternately or simultaneously operated for correspondingly operating said feed means and carriages.

14. In a lathe, a feed shaft, forward and reverse traverse clutches connected therewith for operating said shaft in reverse directions, a feed drive sleeve rotatable upon said shaft, a feed clutch splined to said shaft and cooperable with said sleeve for connecting and disconnecting said sleeve and shaft, interlocked forks for independently controlling said traverse and feed clutches, said forks adapted for relative limited movement, and means for positively moving one of said forks, whereby all clutches may be simultaneously moved to neutral or unclutched position, and whereby when said forward traverse clutch is engaged said feed clutch is conditioned for automatic disengagement.

15. In a lathe, a feed shaft, opposingly related mitre gears rotatable upon said shaft, a traverse clutch splined to said shaft between said gears and adapted for alternate engagement therewith, means for driving said gears in opposite directions, a sleeve rotatable upon said shaft, a feed clutch splined to said shaft and automatically selectively shiftable to cause rotation of said shaft with said sleeve and to release said sleeve conformable to relative speed ratios between said sleeve and shaft, interlocked clutch forks for operating said clutches for simultaneously holding the same in unclutched condition, means for selectively yieldably locking said clutches in forward and reverse traverse positions, and automatic means for releasing said clutches at predetermined intervals.

16. In a lathe, a feed shaft, power and clutch means for selectively driving said shaft in forward and reverse directions, a sleeve rotatable upon said shaft, power means for rotating said sleeve, automatically operable means for coupling and uncoupling said shaft and sleeve, respectively when rate of shaft rotation is less and greater than sleeve rotation, forks for operating said clutch means, and adjustable means in transmission connection with said sleeve for automatically operating said forks at the end of a predetermined period of time.

17. A shaft, a sleeve rotatable thereon, power means for rotating said shaft and sleeve independently, forward and reverse clutches for said shaft, a feed clutch cooperable with said sleeve for connecting and disconnecting the same with and from said shaft, interlocked clutch forks for operating said clutches, and a control shaft for operating said forks.

18. In a machine of the nature disclosed, a bed providing a carriage supporting rail, a carriage translatably supported upon said bed rail, a feed shaft journalled upon said bed parallel with said carriage supporting rail, a tool slide translatably supported upon said carriage, propelling means actuated by said shaft for propelling said carriage and translating said tool slide for tool slide operation in a working cycle from a starting position, transmission mechanism for reversibly rotating said shaft, transmission controlling means for automatically predeterminately governing the feed shaft rotation and reversing after starting for effecting a tool slide working cycle, and manually operable controlling means for said transmission mechanism for stopping and restarting the rotation of said shaft at random during a tool slide operating cycle.

19. In a machine of the nature disclosed, a bed, a carriage translatably supported upon said bed, a feed shaft journalled upon said bed for translating said carriage, a tool slide translatably supported upon said carriage, propelling means actuated by said shaft for propelling said carriage and translating said tool slide for tool slide operation in a complete working cycle from a starting position, transmission mecahnism for reversibly rotating said shaft, transmission controlling means for automatically predeterminately governing the feed shaft rotation and reversing after starting for effecting a tool slide working cycle, and manually operable controlling means for said transmission mechanism for stopping and restarting the rotation of said shaft at random during a tool slide working cycle.

20. In a machine of the nature disclosed, a bed, a carriage translatably supported upon said bed, a feed shaft journalled upon said bed for translating said carriage, a tool slide translatably supported upon said carriage, propelling means actuated by said shaft for propelling said carriage and translating said tool slide for tool slide operation in a complete working cycle from a starting position, transmission mechanism for reversibly rotating said shaft, transmission controlling means for automatically predeterminately governing the feed shaft rotation and reversing after starting for effecting a tool slide working cycle, and manually operable controlling means for said transmission mechanism for controlling the rotation of said shaft independent of said automatic control for stopping and returning said carriage and tool slide to a starting position.

21. In a machine of the nature disclosed, a rotatable work carrying spindle, transmission means for rotating said spindle, carriages translatably supported respectively at opposite sides of the spindle, carriage traversing transmission units, one respectively for each carriage, each unit having selective control for governing and controlling the feed of its carriage, and controlling means common to said transmission units for simultaneous control of said units.

22. In a machine of the class described, a bed, a head stock mounted upon one end of said bed, a spindle journalled in said head stock, change speed transmission gearing within said head stock for rotating said spindle, a main driving shaft for transmitting said change speed gearing, a pair of carriage feed shafts respectively journalled at opposite sides of said bed, constant direction feed shaft transmission mechanism adapted to transmittingly connect said spindle and feed shaft and controllable for independently and simultaneously rotating said feed shafts.

23. In a machine of the class described, a bed, a head stock mounted upon one end of said bed, a spindle journalled in said head stock, change speed transmission gearing within said head stock for rotating said spindle, a main driving shaft for transmitting said change speed gearing, a pair of carriage feed shafts respectively journalled at opposite sides of said bed, constant direction feed shaft transmission mechanism adapted to transmittingly connect said spindle and feed shafts, controllable for independently and simultaneously rotating said feed shafts, and reversing feed shaft transmission mechanism adapted to transmittingly connect said main driving shaft and feed shafts and controllable for independently and simultaneously reversibly rotating said feed shafts.

24. In a machine of the class described, a bed, a carriage translatably supported upon said bed, a feed shaft for translating said carriage, a driving gear for rotating said feed shaft, a clutch for connecting said gear and shaft, clutch shifter means for said clutch, a rod adapted to be actuated by said carriage after a determined degree of carriage travel for operating said clutch shifter means, power driven means for operating said clutch shifter means, friction controlled gearing transmittingly connecting said feed shaft and power driven means, and operated by said rod for automatically operating said clutch to disconnect said driving gear and feed shaft.

25. In a machine of the class described, a bed, a carriage translatably supported upon said bed, a feed shaft for translating said carriage, a driving gear for rotating said shaft, a clutch for connecting said gear and shaft, shifter means for said clutch, a rotative member for actuating said clutch to disconnect said gear and shaft, friction coupled intermediate gearing rotatively connecting said shaft and rotative member, compression means frictionally connecting said gearing and rotative member, and a rod operated by said carriage at a determined limit of carriage travel for operating said compression means.

26. In a machine of the class described, a bed, a carriage translatably supported upon said bed, a feed shaft for translating said carriage, a high speed gear for transmitting said shaft, a first clutch for connecting said shaft and gear, a low speed driving gear for transmitting said shaft, a second clutch for connecting said low speed driving gear and shaft, clutch shifter means for actuating said first clutch, when connected with said high speed gear for disconnecting the same and controlling said second clutch, a rotative member driven by said shaft for actuating said clutch shifter after a periodicity of high speed shaft rotation for disconnecting said high speed gear from said shaft and releasing said second clutch for connecting the low speed gear and shaft, a second rotative member for actuating said second clutch to disconnect said low speed gear and shaft, friction coupled intermediate gearing rotatively connecting said shaft and second rotative member, compression means for frictionally connecting said gearing and second rotative member, and a rod operated by said carriage at a determined limit of carriage travel for operating said compression means.

27. In a machine of the class described, a bed, a carriage translatably supported upon said bed, a feed shaft for translating said carriage, a pair of reversely rotating high speed gears for transmitting said shaft in reverse directions, a first clutch for alternately connecting said gears to said shaft, a low speed gear for transmitting said shaft, a second clutch for connecting said low speed driving gear and shaft, a rotative member driven by said shaft, for operating said first clutch for disconnecting one of said reversing gears after a period of high speed shaft rotation and adapting said second clutch to be operated for connecting said low speed gear and shaft, a second rotative member for actuating said second clutch to disconnect said low speed gear and shaft, friction coupled intermediate gearing rotatively connecting said shaft and second rotative member, compression means for frictionally connecting said gearing and second rotative member, and a rod operated by said carriage at a determined limit of carriage travel for operating said compression means and first clutch to connect a second of said reversing gears and shaft and subsequently disconnect said reversing gear and shaft.

In witness whereof, we hereunto subscribe our names.

EDWARD S. BIRD.
FRANCIS B. COCKBURN.